US012706728B2

(12) United States Patent
Yang et al.

(10) Patent No.: US 12,706,728 B2
(45) Date of Patent: Aug. 11, 2026

(54) SIDELINK FEEDBACK FOR FULL DUPLEX USER EQUIPMENT

(71) Applicant: QUALCOMM Incorporated, San Diego, CA (US)

(72) Inventors: Wei Yang, San Diego, CA (US); Kianoush Hosseini, San Diego, CA (US); Alexandros Manolakos, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 308 days.

(21) Appl. No.: 18/262,892

(22) PCT Filed: Jan. 28, 2022

(86) PCT No.: PCT/US2022/014371
§ 371 (c)(1),
(2) Date: Jul. 25, 2023

(87) PCT Pub. No.: WO2022/211895
PCT Pub. Date: Oct. 6, 2022

(65) Prior Publication Data

US 2024/0089072 A1 Mar. 14, 2024

(30) Foreign Application Priority Data

Mar. 31, 2021 (GR) .............................. 20210100223

(51) Int. Cl.
*H04L 5/14* (2006.01)
*H04W 92/18* (2009.01)

(52) U.S. Cl.
CPC ............... *H04L 5/14* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2020/0351866 | A1* | 11/2020 | Park | H04L 1/1864 |
| 2021/0321396 | A1* | 10/2021 | Li | H04W 72/23 |

(Continued)

FOREIGN PATENT DOCUMENTS

| | | | |
|---|---|---|---|
| WO | WO-2020198616 | A1 | 10/2020 |
| WO | WO-2020210333 | A1 | 10/2020 |
| WO | WO-2021047285 | A1 | 3/2021 |

OTHER PUBLICATIONS

International Search Report and Written Opinion—PCT/US2022/014371—ISA/EPO—May 11, 2022.

*Primary Examiner* — Jeffrey M Rutkowski
(74) *Attorney, Agent, or Firm* — Holland & Hart LLP

(57) ABSTRACT

Methods, systems, and devices for wireless communications are described. A user equipment (UE) may partition a set of available sidelink feedback resources into a first set of sidelink feedback resources and a second set of sidelink feedback resources, wherein the partitioning comprises at least a set of gap resources in a frequency domain between the first set of sidelink feedback resources and the second set of sidelink feedback resources that satisfies a gap threshold. The UE may determine, for each of the first set of sidelink feedback resources and the second set of sidelink feedback resources, a set of sidelink feedback transmissions to perform or a set of sidelink feedback receptions to perform based at least in part on a priority level associated with each sidelink feedback message. The UE may perform the set of sidelink feedback transmissions, the set of sidelink feedback receptions, or both according to the determining.

30 Claims, 13 Drawing Sheets

(56) References Cited

U.S. PATENT DOCUMENTS

| | | | | |
|---|---|---|---|---|
| 2021/0400681 | A1* | 12/2021 | Wang | H04W 72/02 |
| 2022/0232529 | A1* | 7/2022 | Lin | H04W 72/20 |
| 2024/0089924 | A1 | 3/2024 | Yang et al. | |
| 2024/0188103 | A1* | 6/2024 | Löhr | H04W 76/14 |
| 2024/0196188 | A1* | 6/2024 | Kang | H04W 72/566 |
| 2025/0287416 | A1* | 9/2025 | Lee | H04W 52/34 |
| 2026/0095722 | A1* | 4/2026 | de la Broise | H04W 92/18 |

* cited by examiner

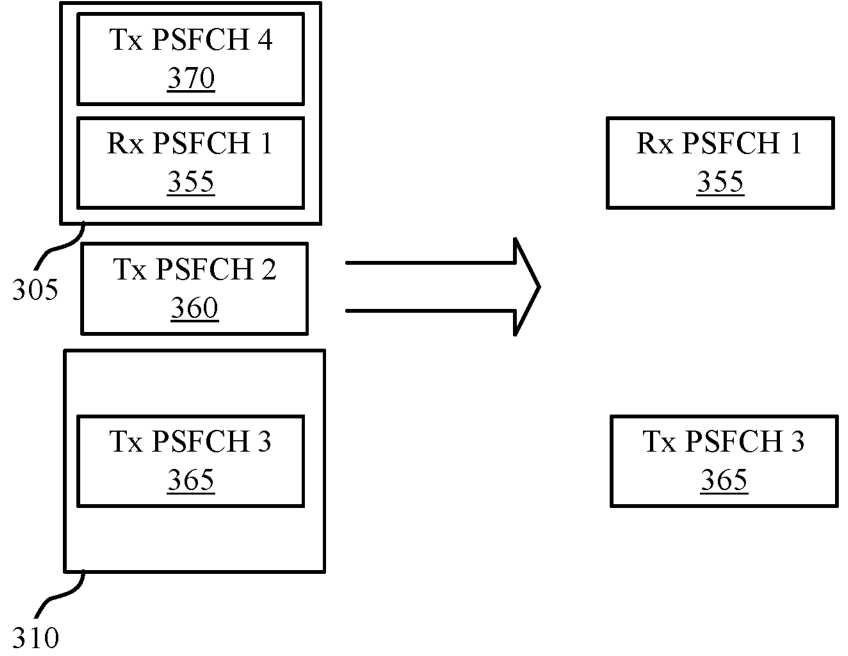
FIG. 3C

600

700

SIDELINK FEEDBACK FOR FULL DUPLEX USER EQUIPMENT

CROSS REFERENCE

The present Application is a 371 national stage filing of International PCT Application No. PCT/US2022/014371 by YANG et al. entitled "SIDELINK FEEDBACK FOR FULL DUPLEX USER EQUIPMENT," filed Jan. 28, 2022; and claims priority to Greece Patent Application No. 20210100223 by YANG et al., entitled "SIDELINK FEEDBACK FOR FULL DUPLEX USER EQUIPMENT," filed Mar. 31, 2021, each of which is assigned to the assignee hereof, and each of which is expressly incorporated by reference in its entirety herein.

FIELD OF TECHNOLOGY

The following relates to wireless communications, including sidelink feedback for full duplex user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink feedback for full duplex user equipment (UE). Generally, aspects of the described techniques provide for sidelink user equipment (UE) to partition sidelink feedback resources into transmit or receive portions to support full duplex sidelink feedback message transmission and reception by the sidelink UE. For example, the sidelink UE may be performing sidelink communications with another sidelink UE (e.g., physical sidelink control channel (PSCCH) and/or physical sidelink shared channel (PSSCH) communications). In some cases, a UE supporting full duplexing may perform sidelink transmissions to the other sidelink UE as well as receiving sidelink transmissions from the other sidelink UE.

Full duplex operations may result in one or more sidelink feedback messages (e.g., physical sidelink feedback channel (PSFCH) feedback messages) to be transmitted to the other sidelink UE (e.g., hybrid automatic repeat/request acknowledgement (HARQ-ACK) feedback messages based on receiving sidelink communications) and one or more PSFCH feedback messages to be received from the other sidelink UE (e.g., HARQ-ACK feedback messages based on transmitting sidelink communications). For example, the sidelink UE may divide or otherwise partition a set of available sidelink feedback resources into a first set of sidelink feedback resources and a second set of sidelink feedback resources. The sidelink UE may determine whether each of the first and second sets of sidelink feedback resources will be used for sidelink feedback transmissions or for sidelink feedback receptions, e.g., based on the partitioning and a priority level associated with each sidelink feedback messages. When both sidelink feedback messages transmissions are to be performed using the first or second set of sidelink feedback resources and sidelink feedback receptions are to be performed using the second or first set of sidelink feedback resources, the partitioning may include the sidelink UE configuring a gap period between the first and second sets of sidelink feedback resources to support full duplex PSFCH communications. Accordingly, the sidelink UE may perform the set of sidelink feedback transmission and/or the set of sidelink feedback receptions based on the determining.

A method for wireless communication at a UE is described. The method may include partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold, determining, for each of the first set of sidelink feedback resources and the second set of sidelink feedback resources, a set of sidelink feedback transmissions to perform or a set of sidelink feedback receptions to perform based on a priority level associated with each sidelink feedback message, and performing the set of sidelink feedback transmissions, the set of sidelink feedback receptions, or both according to the determining.

An apparatus for wireless communication at a UE is described. The apparatus may include a processor, memory coupled with the processor, and instructions stored in the memory. The instructions may be executable by the processor to cause the apparatus to partition a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold, determine, for each of the first set of sidelink feedback resources and the second set of sidelink feedback resources, a set of sidelink feedback transmissions to perform or a set of sidelink feedback receptions to perform based on a priority level associated with each sidelink feedback message, and perform the set of sidelink feedback transmissions, the set of sidelink feedback receptions, or both according to the determining.

Another apparatus for wireless communication at a UE is described. The apparatus may include means for partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold, means for determining, for each of the first set of sidelink feedback resources and the second set of sidelink feedback resources, a set of sidelink feedback transmissions to perform or a set of sidelink feedback receptions to perform based on a priority level associated with each sidelink feedback message, and means for performing the set of sidelink feedback transmissions, the set of sidelink feedback receptions, or both according to the determining.

A non-transitory computer-readable medium storing code for wireless communication at a UE is described. The code may include instructions executable by a processor to partition a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold, determine, for each of the first set of sidelink feedback resources and the second set of sidelink feedback resources, a set of sidelink feedback transmissions to perform or a set of sidelink feedback receptions to perform based on a priority level associated with each sidelink feedback message, and perform the set of sidelink feedback transmissions, the set of sidelink feedback receptions, or both according to the determining.

In some examples of the method, apparatuses, and non-transitory computer-readable medium described herein, performing the set of sidelink feedback transmissions may include operations, features, means, or instructions for performing the set of sidelink feedback transmissions using the first set of sidelink feedback resources and the set of sidelink feedback receptions using the second set of sidelink feedback resources.

Some examples of the method, apparatuses, and non-transitory computer-readable medium described herein may further include operations, features, means, or instructions for performing the set of sidelink feedback transmissions using the first set of sidelink feedback resources and the set of sidelink feedback receptions using the second set of sidelink feedback resources may be based on determining that no sidelink feedback transmissions or sidelink feedback receptions may be scheduled in the set of gap resources.

Some examples of the method, apparatuses, and non-transitory computer-readable medium described herein may further include operations, features, means, or instructions for dropping one or more sidelink feedback transmissions, one or more sidelink feedback receptions, or both, based on determining that the one or more sidelink feedback transmissions, the one or more sidelink feedback receptions, or both, may be scheduled in the set of gap resources.

Some examples of the method, apparatuses, and non-transitory computer-readable medium described herein may further include operations, features, means, or instructions for identifying one or more sidelink feedback transmissions, one or more sidelink feedback receptions, or both, that may be scheduled in the set of gap resources and determining the set of sidelink feedback transmissions to perform or the set of sidelink feedback receptions to perform using the first set of sidelink feedback resources, the second set of sidelink feedback resources, and the set of gap resources based on the identifying.

In some examples of the method, apparatuses, and non-transitory computer-readable medium described herein, designating, prior to the partitioning, the first set of sidelink feedback resources as sidelink feedback transmission resources and the second set of sidelink feedback resources as sidelink feedback reception resources and performing the set of sidelink feedback transmissions using the first set of sidelink feedback resources and the set of sidelink feedback receptions using the second set of sidelink feedback resources based on the designating and the determining.

Some examples of the method, apparatuses, and non-transitory computer-readable medium described herein may further include operations, features, means, or instructions for performing the set of sidelink feedback transmissions using the first set of sidelink feedback resources and the set of sidelink feedback receptions using the second set of sidelink feedback resources based on determining that no sidelink feedback transmissions may be scheduled in the second set of sidelink feedback resources and that no sidelink feedback receptions may be scheduled in the first set of sidelink feedback resources.

Some examples of the method, apparatuses, and non-transitory computer-readable medium described herein may further include operations, features, means, or instructions for dropping one or more sidelink feedback transmissions, one or more sidelink feedback receptions, or both, based on determining that sidelink feedback transmissions may be scheduled in the second set of sidelink feedback resources and that sidelink feedback receptions may be scheduled in the first set of sidelink feedback resources.

Some examples of the method, apparatuses, and non-transitory computer-readable medium described herein may further include operations, features, means, or instructions for mapping a set of sidelink resources of a sidelink shared channel to use for performing sidelink communications based on the partitioning of the set of available sidelink feedback resources into the first set of sidelink feedback resources and the second set of sidelink feedback resources.

In some examples of the method, apparatuses, and non-transitory computer-readable medium described herein, the partitioning may be based on the mapping.

Some examples of the method, apparatuses, and non-transitory computer-readable medium described herein may further include operations, features, means, or instructions for exchanging, with a sidelink UE associated with the sidelink communications, UE capability messages indicating support for the mapping, where the mapping may be based on the UE capability messages.

Some examples of the method, apparatuses, and non-transitory computer-readable medium described herein may further include operations, features, means, or instructions for transmitting an indication of the mapping to a sidelink UE associated with the sidelink communications.

Some examples of the method, apparatuses, and non-transitory computer-readable medium described herein may further include operations, features, means, or instructions for receiving an indication of the mapping from a sidelink UE associated with the sidelink communications, where the mapping may be based on the indication.

BRIEF DESCRIPTION OF THE DRAWINGS

FIGS. 3A-3C illustrate examples of a physical sidelink feedback channel (PSFCH) configuration that supports sidelink feedback for full duplex UE in accordance with aspects of the present disclosure.

DETAILED DESCRIPTION

Figure 1:
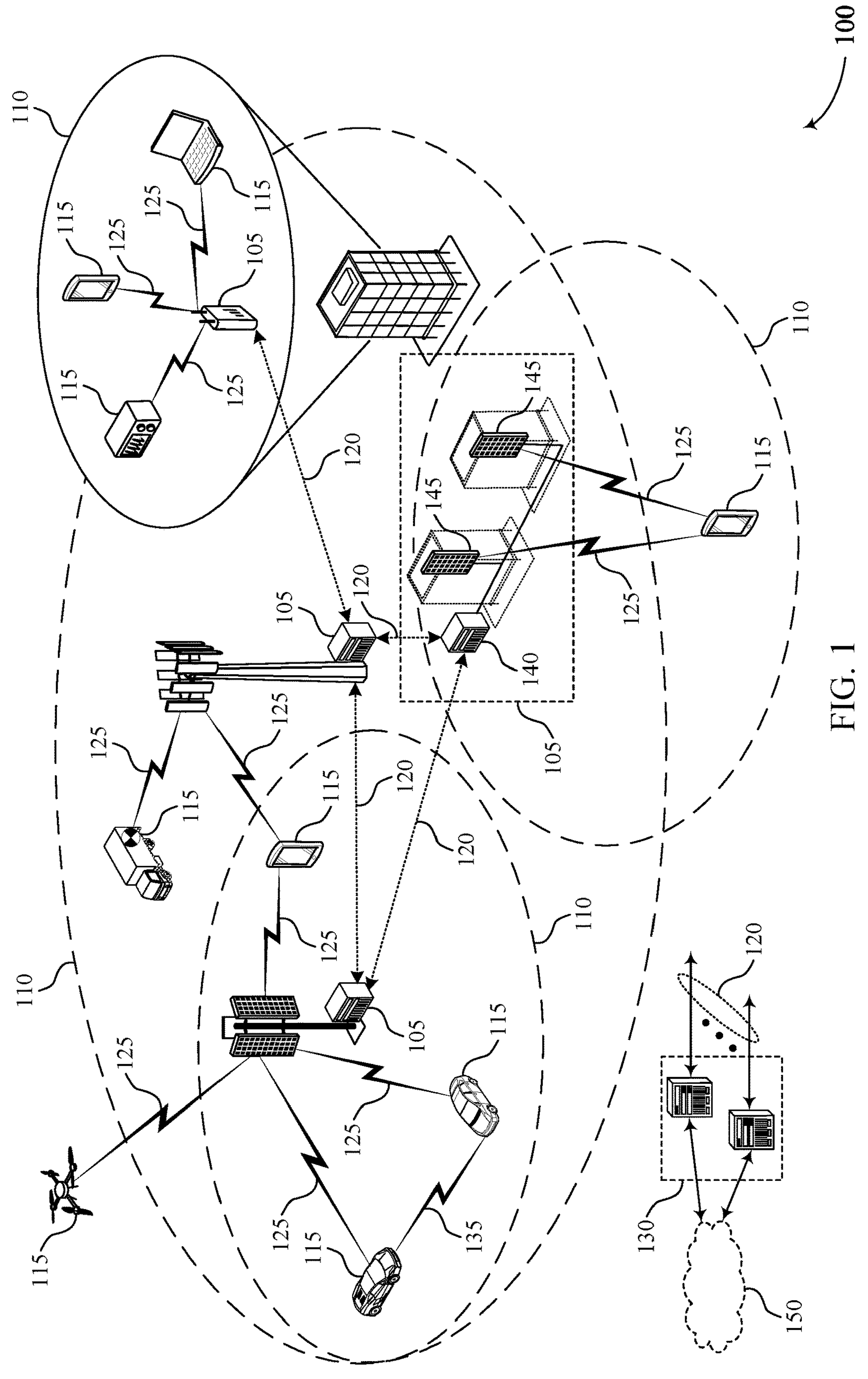
FIG. 1 illustrates an example of a wireless communications system that supports sidelink feedback for full duplex user equipment (UE) in accordance with aspects of the present disclosure.

Some user equipment (UE) may utilize, or otherwise support, full duplex communications. This may include the UE transmitting wireless signal(s) on some resources while receiving wireless signal(s) on other resources at the same time (e.g., concurrently). In one use case, this may include a UE performing sidelink communications with other sidelink UE (e.g., UE-to-UE or inter-UE). For example, a sidelink UE may perform X sidelink feedback transmissions to the other sidelink UE (e.g., physical sidelink feedback channel (PSFCH) transmission) and receive Y sidelink feedback transmissions from the other sidelink UE (e.g., PSFCH reception). Frequency gaps (e.g., guard resource blocks) may be configured between the sidelink PSFCH transmission resources and the sidelink PSFCH reception resources. Conventionally, such UEs may rely on the priority level associated with each PSFCH feedback transmission/reception to allocate the resources used for PSFCH communications. However, simply relying on the priority level for PSFCH signals may be inefficient and result in the sidelink UE dropping too many PSFCH transmissions/receptions. This may increase latency in such sidelink communications, as well as reduce reliability. For example, a dropped PSFCH transmission/reception may mean that the corresponding transmission associated with the PSFCH signal may be unnecessarily retransmitted between the sidelink UE.

Aspects of the disclosure are initially described in the context of wireless communications systems. Generally, aspects of the described techniques provide for sidelink UE to partition sidelink feedback resources into transmit or receive portions to support full duplex sidelink feedback message transmission and reception by the sidelink UE. For example, the sidelink UE may be performing sidelink communications with another sidelink UE (e.g., physical sidelink control channel (PSCCH) and/or physical sidelink shared channel (PSSCH) communications). In some cases, a UE supporting full duplexing may perform sidelink transmissions to the other sidelink UE as well as receiving sidelink transmissions from the other sidelink UE.

Full duplexing operations may result in one or more sidelink feedback messages (e.g., PSFCH feedback messages) to be transmitted to the other sidelink UE (e.g., hybrid automatic repeat/request acknowledgement (HARQ-ACK) feedback messages based on receiving sidelink communications) and one or more PSFCH feedback messages to be received from the other sidelink UE (e.g., HARQ-ACK feedback messages based on transmitting sidelink communications). For example, the sidelink UE may divide or otherwise partition a set of available sidelink feedback resources into a first set of sidelink feedback resources and a second set of sidelink feedback resources. The sidelink UE may determine whether each of the first and second sets of sidelink feedback resources will be used for sidelink feedback transmissions or for sidelink feedback receptions, e.g., based on the partitioning and a priority level associated with each sidelink feedback messages. When both sidelink feedback messages transmissions are to be performed using the first or second set of sidelink feedback resources and sidelink feedback receptions are to be performed using the second or first set of sidelink feedback resources, the partitioning may include the sidelink UE configuring a gap period between the first and second sets of sidelink feedback resources to support full duplex PSFCH communications. Accordingly, the sidelink UE may perform the set of sidelink feedback transmission and/or the set of sidelink feedback receptions based on the determining.

Aspects of the disclosure are further illustrated by and described with reference to apparatus diagrams, system diagrams, and flowcharts that relate to sidelink feedback for full duplex UE.

FIG. 1 illustrates an example of a wireless communications system 100 that supports sidelink feedback for full duplex UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $$T_s = 1/(\Delta f_{max} \cdot N_f)$$

seconds, where $$\Delta f_{max}$$

may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may partition a set of available sidelink feedback resources into a first set of sidelink feedback resources and a second set of sidelink feedback resources, wherein the partitioning comprises at least a set of gap resources in the frequency domain between the first set of sidelink feedback resources and the second set of sidelink feedback resources that satisfies a gap threshold. The UE 115 may determine, for each of the first set of sidelink feedback resources and the second set of sidelink feedback resources, a set of sidelink feedback transmissions to perform or a set of sidelink feedback receptions to perform based at least in part on a priority level associated with each sidelink feedback. The UE 115 may perform the set of sidelink feedback transmissions, the set of sidelink feedback receptions, or both according to the determining.

Figure 2:
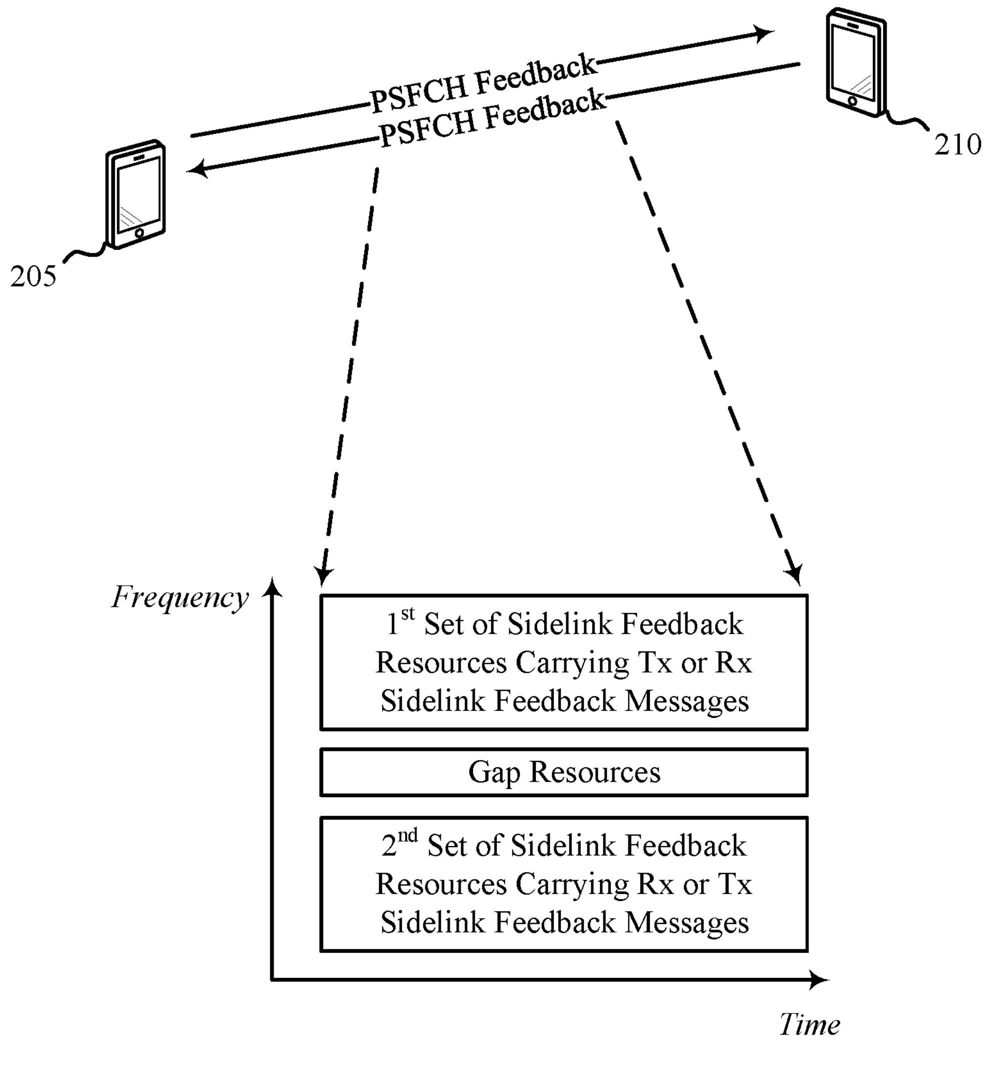
FIG. 2 illustrates an example of a wireless communications system that supports sidelink feedback for full duplex UE in accordance with aspects of the present disclosure.

FIG. 2 illustrates an example of a wireless communications system 200 that supports sidelink feedback for full duplex UE in accordance with aspects of the present disclosure. Wireless communications system 200 may implement aspects of wireless communications system 100. Wireless communications system 200 may include UE 205 and UE 210, which may be examples of the corresponding devices described herein. In some aspects, UE 205 and UE 210 may be configured as, or otherwise support, sidelink UE performing sidelink communications over various sidelink channels.

UE 205 and/or UE 210 may support sidelink feedback (e.g., HARQ-ACK feedback) for sidelink communications. The sidelink feedback may generally refer to HARQ-ACK feedback (e.g., ACK/NACK feedback) being transmitted over a sidelink feedback channel (e.g., PSFCH) for one or more sidelink communications (e.g., PSCCH and/or PSSCH communications). The nature of the sidelink feedback may depend on the direction of the sidelink feedback. For example, a sidelink feedback message may be transmitted from UE 205 to UE 210 indicating HARQ-ACK information for sidelink communications received from UE 210, or vice versa. A sidelink feedback message may be received by UE 205 from UE 210 indicating HARQ-ACK information for sidelink communications transmitted to UE 210, or vice versa. In some examples, each sidelink feedback message may use one bit to convey the ACK/NACK information, although the described techniques are not limited to such one bit PSFCH design considerations.

In some examples, a sidelink UE may need to transmit and receive sidelink feedback at the same time and/or may have X sidelink feedback messages for transmission above its capability. In this situation, the sidelink UE (e.g., UE 205 and/or UE 210) may generally prioritize the sidelink feedback transmissions/receptions of PSFCH based on the priority level of each sidelink feedback message (e.g., based on a priority field value associated with each PSFCH).

In some examples, the sidelink UE may be configured, or otherwise support, full duplex communications where the UE is able to perform transmission(s) to another sidelink UE while concurrently receiving transmissions from other sidelink UE. For example, the sidelink UE may be operating in a sub-band full duplex (SBFD) mode to improve throughput. Full duplex communications may provide, at least to some degree, double the bandwidth/throughput by allowing the base station/UE to transmit and receive on the same set of resources (e.g., the same time resources). Due to full duplex complications (e.g., self-interference between transmission and reception, inter-UE interference, etc.) and additional implementation complexities, SBFD may be considered as a first step to realize at least some of the benefits of full duplex communications, while circumventing some of its complications. For example, with SBFD communications with some gaps (e.g., gap resources) budgeted across downlink and uplink resources, self-interference control may be improved. At the same time, this may allow a device to transmit and receive at the same time in the same band (albeit on different/non-overlapping resources). Accordingly, for cellular communications, an SBFD slot may be partitioned into uplink and downlink portions with gaps in between. For sidelink communications, the resources in a slot may consist of transmit and receive portions, with the gaps in between.

For example, resource pools may be configured with PSFCH resources. The sidelink feedback (e.g., HARQ) may be sequence based (e.g., carrying a single bit per PSCCH/PSSCH) and may be sent on two consecutive symbols (e.g., symbols 11 and 12) of a slot. Typically, one symbol in the time domain is configured before and after the PSFCH resources (e.g., gap symbols). The gaps in the time domain may provide for retuning from transmit-to-receive or from receive-to-transmit configurations by the sidelink UE. In some examples, the gap symbol before the PSFCH symbol may be used for automatic gain control (AGC). The PSFCH resources may be configured using periodPSFCHresource that indicates the PSFCH periodicity, in the number of slots, in the resource pool The periodPSFCHresource value may be set to {0,1,2,4}, with 0 indicating that the PSFCH transmissions from a UE in the resource pool are disabled. The sidelink UE typically transmits the PSFCH (e.g., the sidelink feedback) in the first slot that includes PSFCH resources and is at least a number of slots (e.g., provided by MinTimeGapPSFCH) of the resource pool after a last slot of the PSCCH/PSSCH reception.

For example, the parameter rbSetPSFCH may indicate a set of $$M_{PRB,set}^{PSFCH}$$

PRBs in the resource pool that are used for PSFCH transmissions. The parameter numSubchannel may indicate the number of $N_{subch}$ subchannels for the resource pool. The parameter $$N_{PSSCH}^{PSFCH}$$

may indicate the number of PSSCH slots that are associated with a PSFCH slot, which may be determined using the parameter periodPSFCHresource.

$$\text{The parameter } M_{PRB,set}^{PSFCH} \text{ may be} = \alpha,\ N_{subch} \times N_{PSSCH}^{PSFCH}$$

and the parameter $$M_{subch,slot}^{PSFCH} \text{ may be} = \frac{M_{PRB,set}^{PSFCH}}{N_{subch} \times N_{PSSCH}^{PSFCH}}.$$

Accordingly, PSFCH resource determination by a sidelink UE in some situations may include the UE allocating the $$\left[\left(i + j \cdot N_{PSSCH}^{PSFCH}\right) \cdot M_{subch,slot}^{PSFCH},\ \left(i + 1 + j \cdot N_{PSSCH}^{PSFCH}\right) \cdot M_{PRB,set}^{PSFCH} - 1\right] PRBs \text{ from } M_{PRB,set}^{PSFCH}$$

PRBs to slot I and sub-channel j, where $$0 \le i \le N_{PSSCH}^{PSFCH}$$

and $0 \le j \le N_{subch}$.

One non-limiting example of this configuration may include the PSFCH periodicity $$M_{PSSCH}^{PSFCH}$$

being equal to four, the number of sub-channels of the resource pool $N_{subch}$ being equal to ten, and $$M_{subch,Slot}^{PSFCH} = \frac{80}{4 * 10} = 2 \rightarrow 80\ PRBs$$

being used for PSFCH. In some aspects, each sub-channel may be associated with two PSFCH PRBs, although PSFCH may only be transmitted on one of the PRBs. In this situation, the sidelink UE may select one of the two resources based on the source and the destination identifier (ID) (e.g., i=source ID+destination ID) mod 2.

As discussed, each sidelink feedback message may have an associated priority level (e.g., based on the associated priority field value) and the sidelink UE may generally use the priority level for PSFCH prioritizations. Typically, the prioritization rule for PSFCH transmissions/receptions may be: IF a UE (1) would transmit $N_{sch,Tx,PSFCH}$ PSFCH and receive $N_{sch,Rx,PSFCH}$ PSFCH, and (2) transmissions of $N_{sch,Tx,PSFCH}$ PSFCHs would overlap in time with receptions of the $N_{sch,Rx,PSFCH}$ PSFCHs, THEN the UE transmits or receives only a set of PSFCHs corresponding to the smallest priority field value (e.g., the highest priority level PSFCHs). This may be determined by a first set of sidelink control information (SCI) format 1-A and a second set of SCI format 1-A that are respectively associated with the $N_{sch,Tx,PSFCH}$ PSFCHs and the $N_{sch,Rx,PSFCH}$ PSFCHs. If the UE would transmit $N_{sch,Tx,PSFCH}$ PSFCHs in a PSFCH transmission occasion, the UE transmits $N_{Tx,PSFCH}$ PSFCHs corresponding to the smallest $N_{sch,Tx,PSFCH}$ priority field values indicated in all SCI formats 1-A associated with the PSFCH transmission occasion.

Accordingly, a SBFD UE (e.g., UE 205 and/or UE 210) may be capable of transmitting and receiving at the same time, but the transmissions and receptions must be on different resources (e.g., different frequency resources), with gaps in between. In the situation where a UE is scheduled to transmit X PSFCHs and receive Y PSFCHs, it may be less efficient to always drop all of the transmissions or receptions as is currently done.

Accordingly, aspects of the described techniques provide various mechanisms (e.g., new rule(s)) for the SBFD UEs to determine which PSFCHs to transmit/receive and which PSFCH(s) to drop, while at the same time meeting SBFD requirements. These techniques may include the sidelink UE not transmitting and receiving in the same resource block, may include the gap resources between a transmit portion and a receive portion, and the like.

For example, aspects of the described techniques may include the sidelink UE (e.g., UE 205 in this example, although UE 210 may also perform the same/similar actions) may divide or otherwise partition the set of available sidelink feedback resources (e.g., the PSFCH resource pool) in the frequency domain into two or more segments or portions. This may include partitioning the frequency domain resources of the PSFCH resource pool into a first set of sidelink feedback resources and a second set of sidelink feedback resources. At this point, either set of sidelink feedback resources may be for PSFCH transmissions or for PSFCH receptions. The partitioning may include a set of gap resources being configured, allocated, or otherwise located in between the sets of sidelink feedback resources. The set of gap resources may include one or more resource blocks.

The sidelink UE may then determine, for each set of sidelink feedback resources, whether to perform a set of sidelink feedback transmissions or a set of sidelink feedback receptions. For example, the sidelink UE may determine whether the first set of sidelink feedback resources will be used for the set of sidelink feedback transmissions or for the set of sidelink feedback receptions. Similarly, the sidelink UE may determine whether the second set of sidelink feedback resources will be used for the first set of sidelink feedback transmissions or the set of sidelink feedback receptions. In some aspects, the determining may be based on the priority level of each sidelink feedback message in the first set of sidelink feedback resources and the priority level of each sidelink feedback message in the second set of sidelink feedback resources. The sidelink UE may perform the set of sidelink feedback transmissions and/or the set of sidelink feedback receptions based on the determination.

In some examples, this may include the sidelink UE performing the set of sidelink feedback transmissions using the first set of sidelink feedback resources and the set of sidelink feedback receptions using the second set of sidelink feedback resources. In some situations, this may include no PSFCH transmissions/receptions being scheduled in the guard RBs (e.g., in the gap resources). In this situation, the sidelink UE may perform the prioritization between transmissions and receptions within each set of sidelink feedback resources based on the priority level of each sidelink feedback message. For example, the sidelink UE may drop the PSFCH transmissions or receptions based on the highest priority level of each PSFCH transmission or reception within the segment. Generally, this may result in the sidelink UE either performing PSFCH transmissions in all segments (e.g., in each set of sidelink feedback resources), performing PSFCH receptions in all segments, or performing PSFCH transmissions in some segments and performing PSFCH receptions in other segments.

In some aspects, this may include the sidelink UE determining that no PSFCH feedback transmission or receptions are scheduled in the gap resources and/or dropping sidelink feedback messages (e.g., PSFCH transmissions and/or receptions) that are scheduled in the set of gap resources. For example, the sidelink UE may identify PSFCH transmissions and/or receptions scheduling in the gap resources. Based on the PSFCH scheduled in the gap resources, the sidelink UE may determine or otherwise identify the set of sidelink feedback transmissions or the set of sidelink receptions using the first or second set of sidelink feedback resources. This may include the set of gap resources being configured between the first and second sets of sidelink feedback resources.

For example, if there are no sidelink feedback messages scheduled in the set of gap resources (e.g., in between the partitioned two or more sets of sidelink feedback resources), then the sidelink UE may treat the sets of sidelink feedback resources as a single set of sidelink feedback resources. For example, the prioritization between the PSFCH transmissions and the PSFCH receptions may be performed jointly within the sets of sidelink feedback resources based on the priority level of each sidelink feedback message. That is, the sidelink UE may only perform PSFCH transmissions or PSFCH receptions in the two or more sets of sidelink feedback resources. Additionally and when following the prioritization rules, the PSFCH transmissions/receptions in the guard (e.g., gap resources) of an adjacent pair of segments may be dropped. Then the sidelink UE may drop the corresponding PSFCH schedule in the guard and re-determine the prioritization rules based on the techniques discussed above.

As discussed above, the sidelink UE may generally partition the PSFCH resource pool into the first and second sets of sidelink feedback resources. The sidelink UE may then determine whether the first set is going to be used for PSFCH transmissions or for PSFCH receptions based on the priority level of each sidelink feedback message within the first set of sidelink feedback resources. Similarly, the sidelink UE may also determine whether the second set is going to be used for PSFCH transmissions or for PSFCH receptions based on the priority level of each sidelink feedback message within the second set of sidelink feedback resources.

However, in some examples the sidelink UE may designate the first set of sidelink feedback resources as for sidelink feedback transmissions and the second set of sidelink feedback resources as for sidelink feedback receptions, or vice versa. This designation may be performed before/during the partitioning, but before the sidelink UE determines the set of sidelink feedback transmissions and receptions to perform. For example, the sidelink UE may designate the first set of sidelink feedback resources as sidelink feedback transmission resources and the second set of sidelink feedback resources as sidelink feedback reception resources. The UE may then make the determination of which PSFCH transmission/reception to include in the appropriate set of sidelink feedback resources based on the priority level of each sidelink feedback message within each segment. The sidelink UE may then perform the set of sidelink feedback transmissions using the first set of sidelink feedback resources and the set of sidelink feedback receptions using the second set of sidelink feedback resources.

Accordingly, this may enable the sidelink UE to label each segment (e.g., each set of sidelink feedback resources) as either PSFCH transmit resources or PSFCH receive resources prior to the determination of which sidelink feedback messages to include in each segment based on their priority level. The determination may again be based on any overlap with the set of gap resources. The UE may then determine whether the decision to include/drop PSFCH feedback messages is consistent with the designation. If the include/drop determination is consistent with the designation, then the sidelink UE will follow the designation. Accordingly, the sidelink UE may perform the set of sidelink feedback transmissions using the first set of sidelink feedback resources and the set of sidelink feedback receptions using the second set of sidelink feedback resources. This may be based, at least in some aspects, on determining that no sidelink feedback transmissions are scheduled in the second set of sidelink feedback resources and that no sidelink feedback receptions are scheduled in the first set of sidelink feedback resources.

If the include/drop determination is not consistent, the UE may abandon the designation. That is, instead the UE may disable the full-duplex transmission and determine only to transmit or only to receive (e.g., such as for half-duplex communications). For example, the sidelink UE may drop one or more sidelink feedback transmissions and/or one or more sidelink feedback receptions. This may be based, at least in some aspects, on determining that sidelink feedback transmissions are scheduled in the second set of sidelink feedback resources or that sidelink feedback receptions are scheduled in the first set of sidelink feedback resources. This may provide for full duplex transmission where the sidelink UE may need to perform interference cancellation to remove self-interference, which may be performed based on a predetermination of an assumed transmit/receive pattern.

Figure 3A:
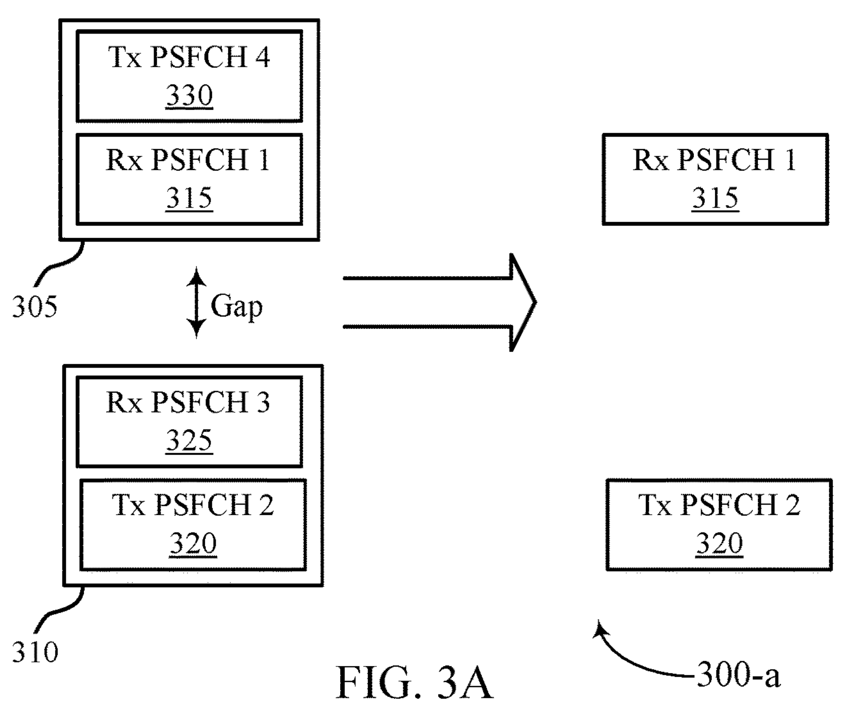
Figure 3B:
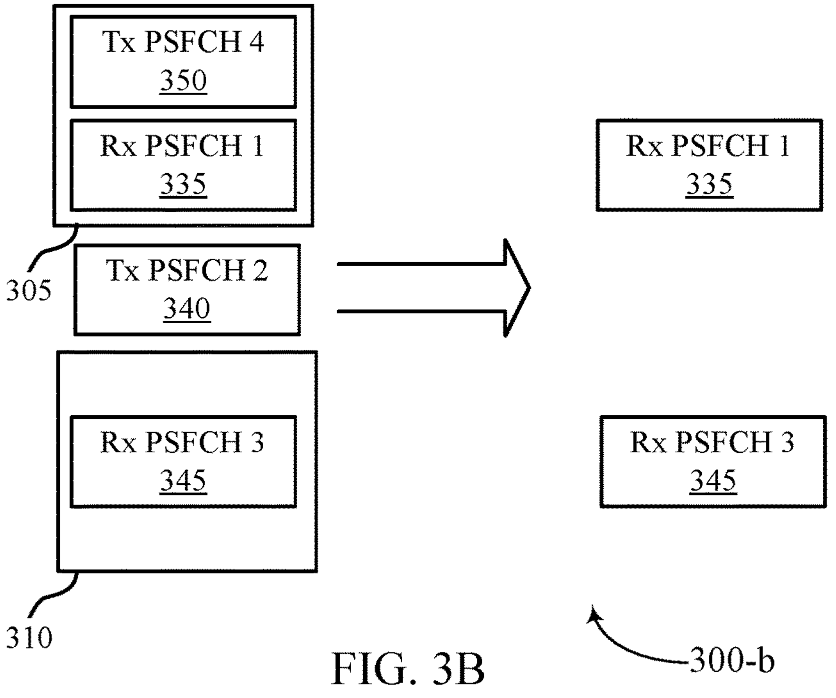

FIGS. 3A-3C illustrate examples of a PSFCH configuration 300 that supports sidelink feedback for full duplex UE in accordance with aspects of the present disclosure. PSFCH configuration 300 may implement, or may be implemented by, wireless communications systems 100 and/or 200. Aspects of PSFCH configuration 300 may be implemented by or at a UE, such as a sidelink UE as described herein. Broadly, PSFCH configuration 300 illustrates an example where frequency is represented along the vertical axis and time is represented along the horizontal axis.

As discussed above, aspects of the described techniques provides mechanisms for a SBFD UE (e.g., a SBFD-capable UE) to partition a PSFCH resource pool, at least in the frequency domain, into two or more segments to use for PSFCH feedback. For example, the sidelink UE may partition a set of available sidelink feedback resources (e.g., the PSFCH resource pool) into a first set of sidelink feedback resources and a second set of sidelink feedback resources. In some aspects, this may include the sidelink UE partitioning, configuring, or otherwise ensuring that a set of gap resources (also in the frequency domain) are in between the first and second sets of sidelink feedback resources.

The sidelink UE may then identify or otherwise determine, on a set of sidelink feedback resource basis, a set of sidelink feedback transmission to perform or a set of sidelink feedback receptions to perform. That is, for each set of sidelink feedback resources of the first and second sets of sidelink feedback resources, the sidelink UE may determine whether that set will include PSFCH transmissions or PSFCH receptions. In some examples, one set may include PSFCH transmissions while the other set may include PSFCH reception. In some examples, both sets may include either PSFCH transmissions or PSFCH receptions. The determination may be based on the priority level of each sidelink feedback message within each set or segment. Accordingly, the sidelink UE may perform the set of sidelink feedback transmissions and/or the set of sidelink feedback receptions based on the determination.

Turning first to PSFCH configuration 300-*a* of FIG. 3A, this may include the sidelink UE partitioning a set of available sidelink feedback messages into a first set of sidelink feedback resources 305 and a second set of sidelink feedback resources 310. This may include the set of gap resources being configured in the frequency domain between the first set of sidelink feedback resources 305 and the second set of sidelink feedback resources 310. The sidelink UE may then determine, for each set of sidelink feedback resources 305 and 310, the set of sidelink feedback transmissions to perform or the set of sidelink feedback receptions to perform. In some aspects, the determination may be based on the priority level of each sidelink feedback message within each set of sidelink feedback resources.

In the non-limiting example illustrated in FIG. 3A and for the first set of sidelink feedback resources 305, this may include the sidelink UE determining that PSFCH 315 and PSFCH 330 are scheduled during the first set of sidelink feedback resources 305. The priority level of PSFCH 315 is 1 and the priority level for PSFCH 330 is 4 (as discussed herein, a lower priority value may be associated with a higher priority level). PSFCH 315 is a PSFCH reception (e.g., a sidelink feedback message reception) and PSFCH 330 is a PSFCH transmission (e.g., a sidelink feedback message transmission). The sidelink UE may order the sidelink feedback messages in a highest-to-lowest priority level ordering scheme within the first set of sidelink feedback resources 305. In the non-limiting example illustrated in FIG. 3A, this may include the sidelink UE dropping PSFCH 330 (e.g., the lowest priority sidelink feedback message, which is also a PSFCH transmission) and keeping PSFCH 315 (e.g., the highest priority sidelink feedback message, which is a PSFCH reception). Accordingly, the first set of sidelink feedback resources 305 may be used for a set of sidelink feedback receptions (e.g., PSFCH 315). The sidelink UE may perform the set of sidelink feedback receptions using the first set of sidelink feedback resources 305.

Similarly and for the second set of sidelink feedback resources 310, this may include the sidelink UE determining that PSFCH 320 and PSFCH 325 are scheduled during the second set of sidelink feedback resources 310. The priority level of PSFCH 320 is 2 and the priority level for PSFCH 325 is 3. PSFCH 325 is a PSFCH reception (e.g., a sidelink feedback message reception) and PSFCH 320 is a PSFCH transmission (e.g., a sidelink feedback message transmission). The sidelink UE may order the sidelink feedback messages in a highest-to-lowest priority level ordering scheme within the second set of sidelink feedback resources 310. In the non-limiting example illustrated in FIG. 3A, this may include the sidelink UE dropping PSFCH 325 (e.g., the lowest priority sidelink feedback message, which is also a PSFCH reception) and keeping PSFCH 320 (e.g., the highest priority sidelink feedback message, which is a PSFCH transmission). Accordingly, the second set of sidelink feedback resources 310 may be used for a set of sidelink feedback transmissions (e.g., PSFCH 320). The sidelink UE may perform the set of sidelink feedback transmissions using the second set of sidelink feedback resources 310. The UE may perform the set of sidelink feedback receptions using the first set of sidelink feedback resources 305 and perform the set of sidelink feedback transmissions using the second set of sidelink feedback resources 310 at the same time (e.g., concurrently).

Turning next to PSFCH configuration 300-*b* of FIG. 3B, this may include the sidelink UE partitioning a set of available sidelink feedback messages into a first set of sidelink feedback resources 305 and a second set of sidelink feedback resources 310. This may include the set of gap resources being configured in the frequency domain between the first set of sidelink feedback resources 305 and the second set of sidelink feedback resources 310. The sidelink UE may then determine, for each set of sidelink feedback resources, the set of sidelink feedback transmissions to perform or the set of sidelink feedback receptions to perform. In some aspects, the determination may be based on the priority level of each sidelink feedback message within each set of sidelink feedback resources.

In the non-limiting example illustrated in FIG. 3B and for the first set of sidelink feedback resources 305, this may include the sidelink UE determining that PSFCH 335 and PSFCH 350 are scheduled during the first set of sidelink feedback resources 305. The priority level of PSFCH 335 is 1 and the priority level for PSFCH 350 is 4. PSFCH 335 is a PSFCH reception (e.g., a sidelink feedback message reception) and PSFCH 350 is a PSFCH transmission (e.g., a sidelink feedback message transmission). The sidelink UE may order the sidelink feedback messages in a highest-to-lowest priority level ordering scheme within the first set of sidelink feedback resources 305. In the non-limiting example illustrated in FIG. 3B, this may include the sidelink UE dropping PSFCH 350 (e.g., the lowest priority sidelink feedback message, which is also a PSFCH transmission) and keeping PSFCH 335 (e.g., the highest priority sidelink feedback message, which is a PSFCH reception). Accordingly, the first set of sidelink feedback resources 305 may be used for a set of sidelink feedback receptions (e.g., PSFCH 335). The sidelink UE may perform the set of sidelink feedback receptions using the first set of sidelink feedback resources 305.

Similarly and for the second set of sidelink feedback resources 310, this may include the sidelink UE determining that PSFCH 345 is scheduled during the second set of sidelink feedback resources 310. In this example, PSFCH 340 is scheduled during the set of gap resources between the first set of sidelink resources 305 and the second set of sidelink feedback resources 310. The priority level of PSFCH 345 is 3 and the priority level for PSFCH 340 is 2. PSFCH 345 is a PSFCH reception (e.g., a sidelink feedback message reception) and PSFCH 340 is a PSFCH transmission (e.g., a sidelink feedback message transmission). Since PSFCH 340 is in between the first set of sidelink feedback resources 305 and the second set of sidelink feedback resources 310, the sidelink UE may drop PSFCH 340. The sidelink UE may order the sidelink feedback messages in a highest-to-lowest priority level ordering scheme within the second set of sidelink feedback resources 310. In the non-limiting example illustrated in FIG. 3B, this may include the sidelink UE dropping PSFCH 340 (e.g., the highest priority sidelink feedback message, which is also a PSFCH transmission, because it is scheduled in the set of gap resources) and keeping PSFCH 345 (e.g., the only remaining sidelink feedback message, which is a PSFCH reception). Accordingly, the second set of sidelink feedback resources 310 may be used for a set of sidelink feedback receptions (e.g., PSFCH 345). The sidelink UE may perform the set of sidelink feedback receptions using the second set of sidelink feedback resources 310. The UE may perform the set of sidelink feedback receptions using the first set of sidelink feedback resources 305 and perform the set of sidelink feedback receptions using the second set of sidelink feedback resources 310 at the same time (e.g., concurrently). In this situation, the sidelink UE may treat the first set of sidelink feedback resources 305 and the second set of sidelink feedback resources 310 as a single set of sidelink feedback resources.

Turning finally to PSFCH configuration 300-*c* of FIG. 3C, this may include the sidelink UE partitioning a set of available sidelink feedback messages into a first set of sidelink feedback resources 305 and a second set of sidelink feedback resources 310. This may include the set of gap resources being configured in the frequency domain between the first set of sidelink feedback resources 305 and the second set of sidelink feedback resources 310. The sidelink UE may then determine, for each set of sidelink feedback resources, the set of sidelink feedback transmissions to perform or the set of sidelink feedback receptions to perform. In some aspects, the determination may be based on the priority level of each sidelink feedback message within each set of sidelink feedback resources.

In the non-limiting example illustrated in FIG. 3C and for the first set of sidelink feedback resources 305, this may include the sidelink UE determining that PSFCH 355 and PSFCH 370 are scheduled during the first set of sidelink feedback resources 305. The priority level of PSFCH 355 is 1 and the priority level for PSFCH 370 is 4. PSFCH 355 is a PSFCH reception (e.g., a sidelink feedback message reception) and PSFCH 370 is a PSFCH transmission (e.g., a sidelink feedback message transmission). The sidelink UE may order the sidelink feedback messages in a highest-to-lowest priority level ordering scheme within the first set of sidelink feedback resources 305. In the non-limiting example illustrated in FIG. 3C, this may include the sidelink UE dropping PSFCH 370 (e.g., the lowest priority sidelink feedback message, which is a PSFCH transmission) and keeping PSFCH 355 (e.g., the highest priority sidelink feedback message, which is a PSFCH reception). Accordingly, the first set of sidelink feedback resources 305 may be used for a set of sidelink feedback receptions (e.g., PSFCH 355). The sidelink UE may perform the set of sidelink feedback receptions using the first set of sidelink feedback resources 305.

Similarly and for the second set of sidelink feedback resources 310, this may include the sidelink UE determining that PSFCH 365 is scheduled during the second set of sidelink feedback resources 310. In this example, PSFCH 360 is scheduled during the set of gap resources between the first set of sidelink resources 305 and the second set of sidelink feedback resources 310. The priority level of PSFCH 365 is 3 and the priority level for PSFCH 360 is 2. PSFCH 365 is a PSFCH transmission (e.g., a sidelink feedback message transmission) and PSFCH 360 is also a PSFCH transmission (e.g., a sidelink feedback message transmission). Since PSFCH 360 is in between the first set of sidelink feedback resources 305 and the second set of sidelink feedback resources 310, the sidelink UE may drop PSFCH 360. The sidelink UE may order the sidelink feedback messages in a highest-to-lowest priority level ordering scheme within the second set of sidelink feedback resources 310. In the non-limiting example illustrated in FIG. 3C, this may include the sidelink UE dropping PSFCH 360 (e.g., the highest priority sidelink feedback message, which is also a PSFCH transmission, because it is scheduled in the set of gap resources) and keeping PSFCH 365 (e.g., the only remaining sidelink feedback message, which is a PSFCH transmission). Accordingly, the second set of sidelink feedback resources 310 may be used for a set of sidelink feedback transmissions (e.g., PSFCH 365). The sidelink UE may perform the set of sidelink feedback transmissions using the second set of sidelink feedback resources 310. The UE may perform the set of sidelink feedback receptions using the first set of sidelink feedback resources 305 and perform the set of sidelink feedback transmissions using the second set of sidelink feedback resources 310 at the same time (e.g., concurrently). In this situation, the sidelink UE may treat the first set of sidelink feedback resources 305 and the second set of sidelink feedback resources 310 as separate sets of sidelink feedback resources.

In some examples of PSFCH configuration 300, the sidelink UE may train its transmitter and receiver to perform self-interference cancellation based on the transmission/reception partitions.

In some examples of PSFCH configuration 300-*b* and/or PSFCH configuration 300-*c*, three schemes may be supported (e.g., Scheme A, Scheme B, and Scheme C).

In Scheme A, the described techniques may support, if the UE determines that there are one or more PSFCHs scheduled in the gap resources, then the UE may not use the partitioning of first and second set of resources, but instead treat all feedback resources in the resource pool as a whole set, and perform prioritization in the whole set. In the example illustrated in PSFCH configuration 300-*b*, the result of Scheme A may be that the UE determines that, within the four channels illustrated in the figure, receive PSFCH 1 has the highest priority, hence the UE may only receive PSFCHs in the whole set of resources. The UE may drop all transmitted resources. And similarly in the example illustrated in PSFCH configuration 300-*c*, the UE may determine that only receive PSFCH 1 355 can be received, all other PSFCHs (i.e., PSFCH transmissions) are dropped. This result is different from the non-limiting result illustrated in PSFCH configuration 300-*c*.

Scheme B may include always dropping the channels in the gap first (e.g., the transmit PSFCH 2 in PSFCH configurations 300-*b* and 300-*c*). Then the UE performs prioritizations within each segments/sets as illustrated in PSFCH configuration 300-*a*.

Finally, in Scheme C the UE may first perform Scheme A and determine a set of (intermediate) channels to transmit or to receive. Then, the UE further checks whether or not the channels in the gap (e.g., the transmit PSFCH 2 in PSFCH configurations 300-*b* and 300-*c*) are dropped in the prioritization according to Scheme A. If the channel is dropped (as in the examples illustrated in PSFCH configuration 300-*b* and 300-*c*), then the UE may switch to Scheme B (e.g., the UE drops the transmit PSFCH 2), and then performing the partition again into two sets, and determine a channel in each set of resources 305 and 315, separately. On the other hand, if the UE determines that the channel in the gap is not dropped (e.g., when it has a higher priority than other channels), the UE may not change the decision and proceed as in Scheme A. In some aspects, the decision to drop the channels in the gap in Scheme C may be due to prioritization across all resources first, whereas in Scheme B the UE always drops the channels in the gap, regardless of the priority of such channels.

Figure 4:
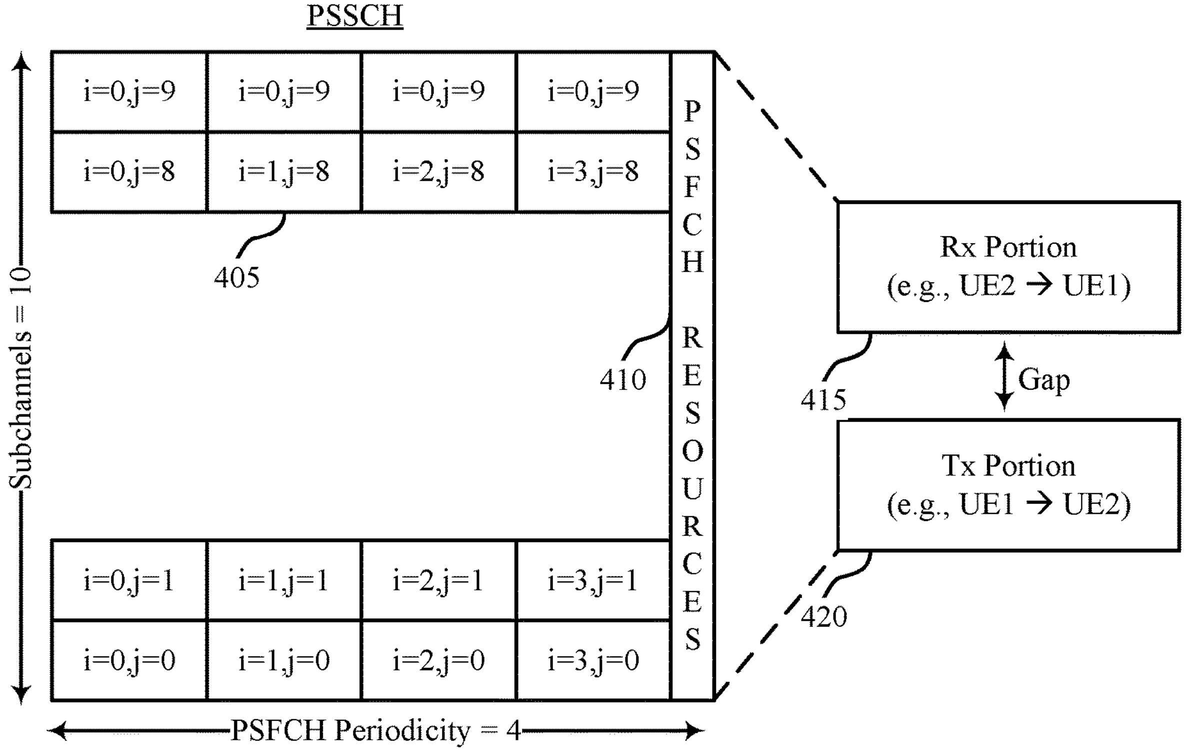
FIG. 4 illustrates an example of a PSFCH configuration that supports sidelink feedback for full duplex UE in accordance with aspects of the present disclosure.

FIG. 4 illustrates an example of a PSFCH configuration 400 that supports sidelink feedback for full duplex UE in accordance with aspects of the present disclosure. PSFCH configuration 400 may implement, or may be implemented by, wireless communications systems 100 and/or 200 and/or PSFCH configuration 300. Aspects of PSFCH configuration 400 may be implemented by or at a UE, such as a sidelink UE as described herein.

As discussed above, aspects of the described techniques provide mechanisms for a SBFD UE to partition a PSFCH resource pool, at least in the frequency domain, into two or more segments to use for PSFCH feedback. For example, the sidelink UE may partition a set of available sidelink feedback resources (e.g., the PSFCH resource pool) into a first set of sidelink feedback resources and a second set of sidelink feedback resources. In some aspects, this may include the sidelink UE partitioning, configuring, or otherwise ensuring that a set of gap resources (also in the frequency domain) are in between the first and second sets of sidelink feedback resources.

The sidelink UE may then identify or otherwise determine, on a set of sidelink feedback resource basis, a set of sidelink feedback transmission to perform or a set of sidelink feedback receptions to perform. That is, for each set of sidelink feedback resources, the sidelink UE may determine whether that set will include PSFCH transmissions or PSFCH receptions. In some examples, one set may include PSFCH transmissions while the other set may include PSFCH reception. In some examples, both sets may include either PSFCH transmissions or PSFCH receptions. The determination may be based on the priority level of each sidelink feedback message within each set or segment. Accordingly, the sidelink UE may perform the set of sidelink feedback transmissions and/or the set of sidelink feedback receptions based on the determination.

Such techniques allow the sidelink UE to operate in the full duplex mode in certain scenarios. However, conventional techniques do not provide a mechanism to map PSSCH communications (e.g., PSSCH communications) to PSFCH in a manner that optimizes the techniques discussed above. However, in some examples of the techniques described herein may include the sidelink UE mapping a set of sidelink resources of a sidelink shared channel (e.g., PSCCH/PSSCH) to use for sidelink communications based on the partitioning of the set of available sidelink feedback resources into the first and second sets of sidelink feedback resources. For example, in the situation where a pair of sidelink UEs having an established unicast session, this may include changing the PSSCH to PSFCH mapping rule to ensure that the PSFCH transmissions and PSFCH receptions are always mapped to different resources that conform to the SBFD techniques.

This may include mapping sidelink communications 405 used for PSCCH/PSSCH communications based on the partitioning of the set of available sidelink feedback resources 410 into the first set of sidelink feedback resources 415 and the second set of sidelink feedback resources 420. Or conversely, this may include partitioning the set of available sidelink feedback resources 410 into the first set of sidelink feedback resources 415 and the second set of sidelink feedback resources 420 based on the set of sidelink resources of the sidelink shared channel used for performing sidelink communications. For example, when determining the mapping, the sidelink UE may consider the direction of the PSFCH communication (e.g., transmission or reception based on the perspective of the sidelink UE). From the sidelink UE perspective doing the mapping, this may include mapping a PSFCH transmission to a PSCCH/PSSCH reception and mapping a PSFCH reception to a PSCCH/PSSCH transmission. In other words, for a same PSSCH/PSCCH resource, it may be mapped either to the first set or to the second set, based on whether the PSSCH/PSCCH is a reception or a transmission from the perspective of the sidelink UE. For example, in a slot i on subchannel j, a UE may receive a PSSCH/PSCCH. In this case, the UE may transmit the corresponding PSFCH in the first set. On the other hand, if in the slot i and subchannel j the UE transmits a PSSCH/PSCCH to a second UE, then the UE will be receiving the corresponding PSFCH in a resource in the second set of resources from the second UE.

For example, the pair of sidelink UE may have an established sidelink unicast session where the set of sidelink resources for sidelink communications 405 includes 10 subchannels (j) and a periodicity of four slots (i). In some examples, the sidelink UE may schedule PSCCH/PSSCH (e.g., sidelink communications 405) between each other such that PSCCH/PSSCH transmissions from a first UE to a second UE are mapped to subchannel(s) that include the partitioned sets of sidelink feedback resources 415/420 corresponding to a set of sidelink feedback receptions. Similarly, the sidelink UE may schedule PSCCH/PSSCH (e.g., sidelink communications 405) between each other such that PSCCH/PSSCH receptions by the first UE from the second UE are mapped to subchannel(s) that include the partitioned sets of sidelink feedback resources 415/420 corresponding to a set of sidelink feedback transmissions. Accordingly, mapping of the PSCCH/PSSCH resources (e.g., the sidelink communications 405) to certain subchannels may improve alignment between the partitioning and the expected PSFCH direction between the pair of sidelink UE.

In some aspects, the mapping may be based on negotiations between the pair of sidelink UE and/or may be based on a configuration. For example, each sidelink UE may receive a configuration message from a serving base station indicating which mapping rule is to be applied to sidelink communications 405 (e.g., the conventional mapping rule or the PSCCH/PSSCH-to-PSFCH mapping rule). The configuration signal may include RRC messages, MAC CE messages, DCI messages, and the like.

In some examples, the pair of sidelink UE may perform negotiations to determine which mapping rule to apply to scheduling sidelink communications. For example, the pair of sidelink UEs may exchange a UE capability message carrying or otherwise conveying an indication of support for the PSCCH/PSSCH-to-PSFCH mapping that more closely align the sidelink communication 405 direction to the PSFCH partitioning. Based on the negotiation and/or configuration, one sidelink UE may select the appropriate mapping rule and transmit an indication of the mapping to the other sidelink UE.

The PSCCH/PSSCH-to-PSFCH mapping rule between the pair of sidelink UE would be generally only known to the pair of sidelink UE. Other UE may be unaware of such mapping. This permits PSFCH communications between the pair of sidelink UE to always be mapped to the correct portion of the PSFCH resources (e.g., avoid mapping PSFCH to the set of gap resources). However, one or both of the pair of sidelink UE may also be communicating with other sidelink UE via groupcast or broadcast communications and/or in a separate unicast session, where the other sidelink UE may not support the PSCCH/PSSCH-to-PSFCH mapping rule. For such other sidelink communications, the PSCCH/PSSCH-to-PSFCH mapping rule may follow the conventional approach, and therefore may be mapped arbitrarily (e.g., a PSCCH/PSSCH transmission may be mapped to subchannel (j) that is part of the configuration for PSFCH transmissions). Accordingly, exchanging the UE capability messages between any pair of sidelink UE may be used to determine whether the pair of sidelink UE may use the conventional (arbitrarily) or the improved PSCCH/PSSCH-to-PSFCH mapping rule where the direction of sidelink communications 405 is aligned with the partitioned direction of PSFCH resources.

Figure 5:
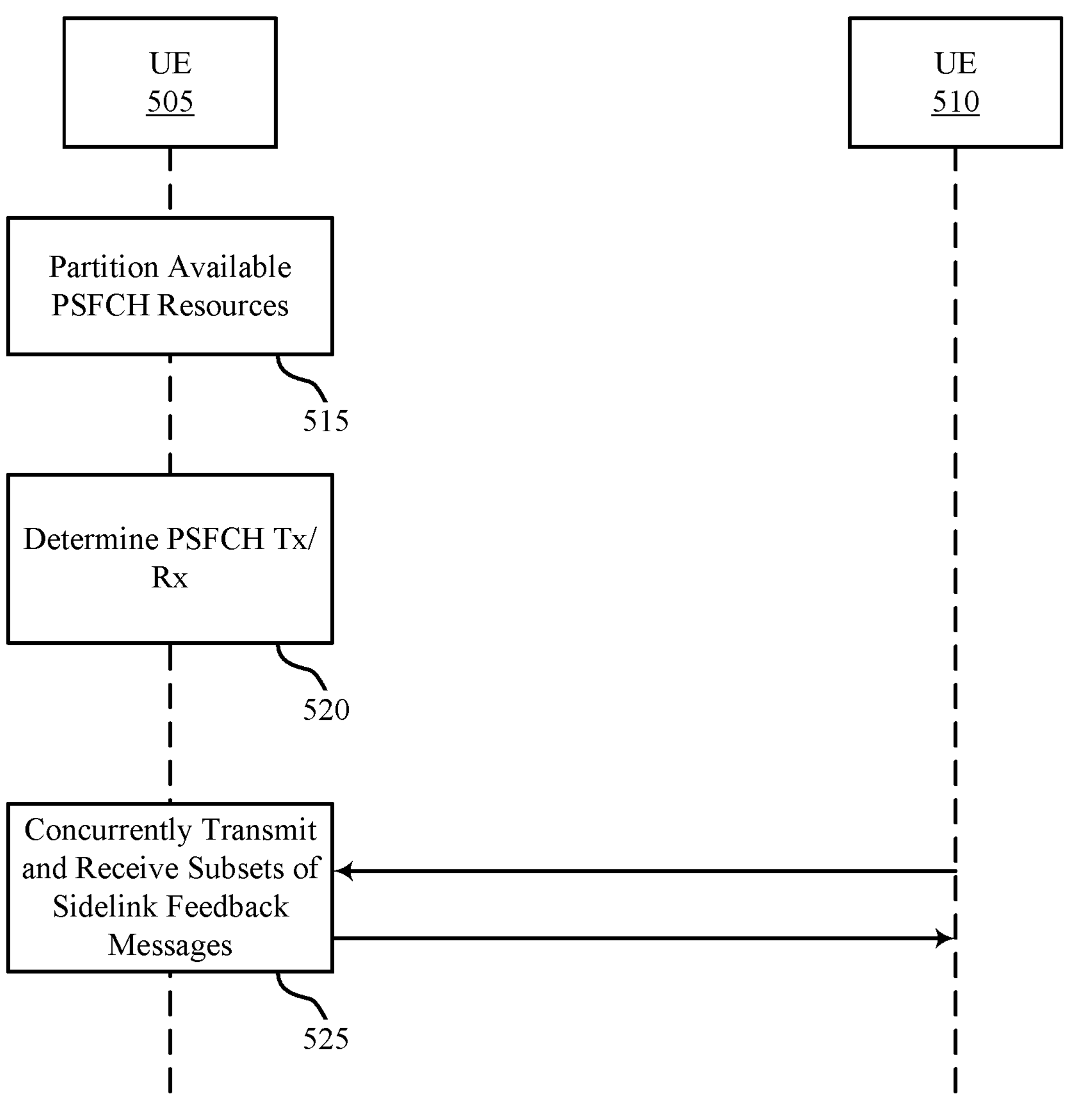
FIG. 5 illustrates an example of a process that supports sidelink feedback for full duplex UE in accordance with aspects of the present disclosure.

FIG. 5 illustrates an example of a process 500 that supports sidelink feedback for full duplex UE in accordance with aspects of the present disclosure. Aspects of process 500 may be implemented at or implemented by wireless communications systems 100 and/or 200, and/or PSFCH configurations 300 and/or 400. Aspects of process 500 may be implemented by or at UE 505 and/or UE 510, which may be examples of the corresponding devices described herein. Although the features of process 500 are described generally is being implemented by UE 505, it is to be understood that UE 510 may also implement such techniques.

At 515, UE 505 may divide or otherwise partition the set of available sidelink feedback resources (e.g., PSFCH resources) into a first set of sidelink feedback resources and a second set of sidelink feedback resources. In some aspects, this may be based on, or otherwise include, as set of gap resources in the frequency domain between the first set in the second set of sidelink feedback resources. In some aspects, the set of gap resources may span enough of the frequency domain to satisfy or otherwise correspond to a gap threshold (e.g., at least one resource block, but more than one resource block may also be used).

In some examples, UE 505 may designate, prior to the partitioning, the first set of sidelink feedback resources as sidelink feedback transmission resources and the second set of sidelink feedback resources as sidelink feedback reception resources, or vice versa. In other examples, UE 505 may not perform such pre-designation of the sets of sidelink feedback resources.

At 520, UE 505 may select, configure, or otherwise determine a set of sidelink feedback transmissions to perform or a set of sidelink feedback receptions to perform based on the priority level associated with each sidelink feedback message. UE 505 may determine this for each of the first set of sidelink feedback resources and the second set of sidelink feedback resources. That is, UE 505 may use the priority level of each sidelink feedback message configured within the first set of sidelink feedback resources to determine whether that set of sidelink feedback resources will be used for sidelink feedback transmissions or for sidelink feedback receptions. Similarly, UE 505 may use the priority level of each sidelink feedback message configured within the second set of sidelink feedback resources to determine whether that set of sidelink feedback resources will be used for sidelink feedback transmissions or for sidelink feedback receptions. In some aspects, this may be based on the direction of the sidelink feedback message(s) in each set of sidelink feedback resources.

At 525, UE 505 may perform (together with UE 510) the set of sidelink feedback transmissions and/or the set of sidelink feedback receptions based on the determination. For example, if UE 505 determines that the first set of sidelink feedback resources will be used for a set of sidelink feedback transmissions, then UE 505 may transmit the sidelink feedback messages using the first set of sidelink feedback resources. If UE 505 determines that the first set of sidelink feedback resources will be used for the set of sidelink feedback receptions, then UE 505 may receive the sidelink feedback messages using the first set of sidelink feedback resources. UE 505 may perform similar steps for the second set of sidelink feedback resources to determine whether it will be used for sidelink feedback receptions or for sidelink feedback transmissions.

In some aspects, this may include UE 505 performing the set of sidelink feedback transmissions using the first set of sidelink feedback resources and the set of sidelink feedback receptions using the second set of sidelink feedback resources, or vice versa. For example, this may be based, at least in some aspects, on a determination that no sidelink feedback transmissions or sidelink feedback receptions (e.g., no sidelink feedback message(s)) are scheduled in the set of gap resources. For example, UE 505 may drop sidelink feedback message(s) that are scheduled in the set of gap resources.

For example, UE 505 may identify or otherwise determine that sidelink feedback message(s) (sidelink feedback transmissions and/or sidelink feedback receptions) are scheduled in the set of gap resources. The determination of whether to use the first set or the second set of sidelink feedback resources for the set of sidelink feedback transmissions or for the set of sidelink feedback receptions may be based on identifying that the sidelink feedback message(s) are scheduled in the set of resources.

As discussed above, in some examples UE 505 may designate the first set of sidelink feedback resources as sidelink feedback transmission resources and the second set of sidelink feedback resources as sidelink feedback reception resources, or vice versa. In this example, UE 505 may perform the set of sidelink feedback transmissions using the first set of sidelink feedback resources and the set of sidelink feedback receptions using the second set of sidelink feedback resources. This may be based, at least in some aspects, on determining that no sidelink feedback transmissions are scheduled in the second set of sidelink feedback resources and that no sidelink feedback receptions are scheduled in the first set of sidelink feedback resources. UE 505 may drop sidelink feedback transmissions that are scheduled in the second set of sidelink feedback resources and/or sidelink feedback receptions that are scheduled in the first set of sidelink feedback resources.

In some aspects, this may include UE 505 and/or UE 510 adopting a PSCCH/PSSCH-to-PSFCH mapping scheme where sidelink resources of a sidelink shared channel (e.g., PSCCH and/or PSSCH resources) based on partitioning the set of available sidelink feedback resources. For example, UE 505 and/or UE 510 may schedule sidelink communications on such channels based on the set of available sidelink feedback resources partitioned into the first and second sets of sidelink feedback resources. Additionally, or alternatively, the partitioning discussed above may be based on the scheduled sidelink communications. In some aspects, this may be based on UE 505 and UE 510 exchanging UE capability messages indicating whether they support such mapping. Based on the exchanges, one or both of UEs may adopt such mapping and then provide an indication of the mapping to the other sidelink UE.

Figure 6:
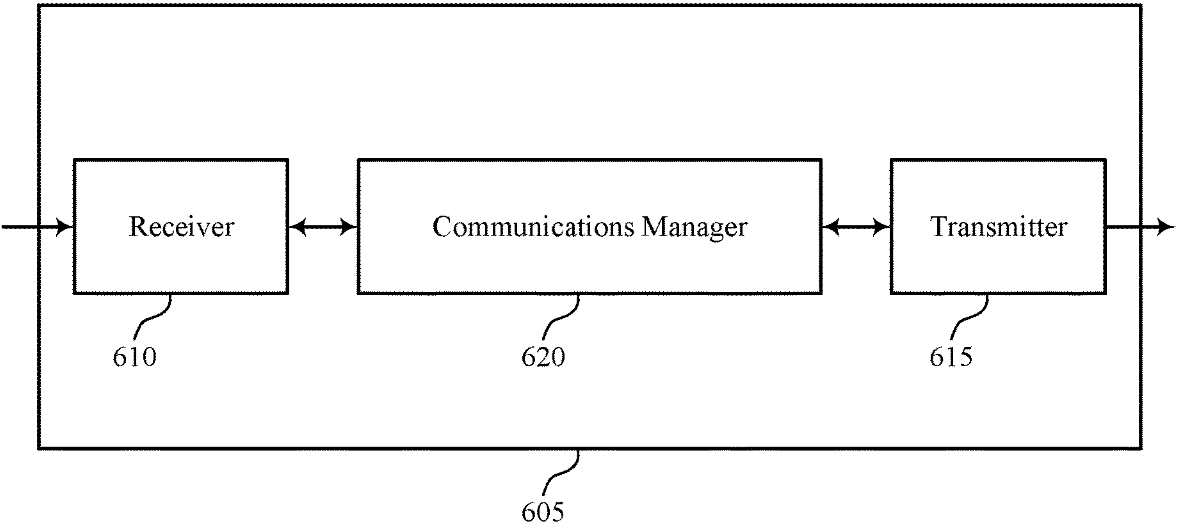
FIGS. 6 and 7 show block diagrams of devices that support sidelink feedback for full duplex UE in accordance with aspects of the present disclosure.

FIG. 6 shows a block diagram 600 of a device 605 that supports sidelink feedback for full duplex UE in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink feedback for full duplex UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink feedback for full duplex UE). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sidelink feedback for full duplex UE as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The communications manager 620 may be configured as or otherwise support a means for determining, for each of the first set of sidelink feedback resources and the second set of sidelink feedback resources, a set of sidelink feedback transmissions to perform or a set of sidelink feedback receptions to perform based on a priority level associated with each sidelink feedback message. The communications manager 620 may be configured as or otherwise support a means for performing the set of sidelink feedback transmissions, the set of sidelink feedback receptions, or both according to the determining.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved PSFCH communications by intelligent partitioning/mapping of available PSFCH resources into two or more segments and then using the priority level of each sidelink feedback message within each segment to perform sidelink feedback.

Figure 7:
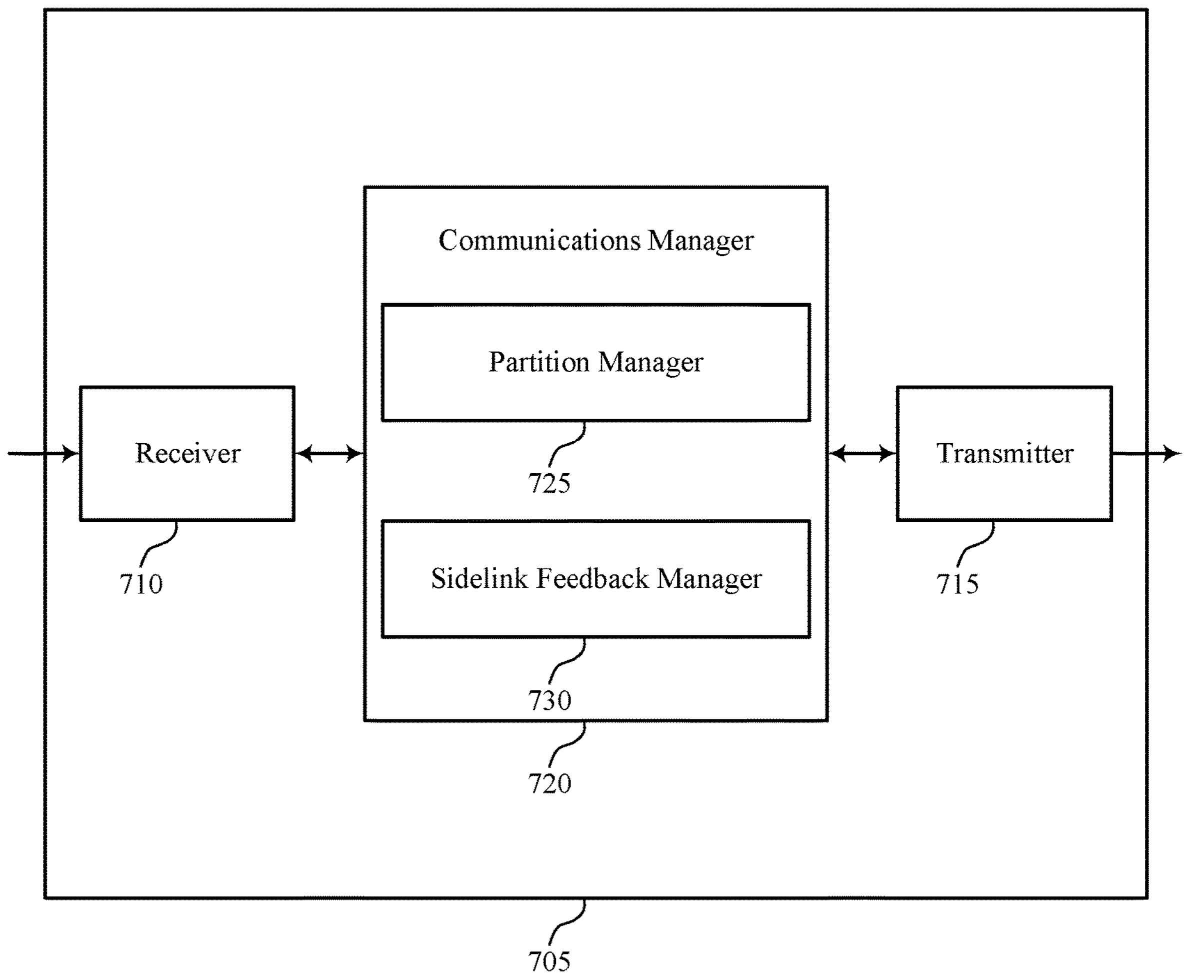

FIG. 7 shows a block diagram 700 of a device 705 that supports sidelink feedback for full duplex UE in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink feedback for full duplex UE). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink feedback for full duplex UE). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sidelink feedback for full duplex UE as described herein. For example, the communications manager 720 may include a partition manager 725 a sidelink feedback manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The partition manager 725 may be configured as or otherwise support a means for partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The sidelink feedback manager 730 may be configured as or otherwise support a means for determining, for each of the first set of sidelink feedback resources and the second set of sidelink feedback resources, a set of sidelink feedback transmissions to perform or a set of sidelink feedback receptions to perform based on a priority level associated with each sidelink feedback message. The sidelink feedback manager 730 may be configured as or otherwise support a means for performing the set of sidelink feedback transmissions, the set of sidelink feedback receptions, or both according to the determining.

Figure 8:
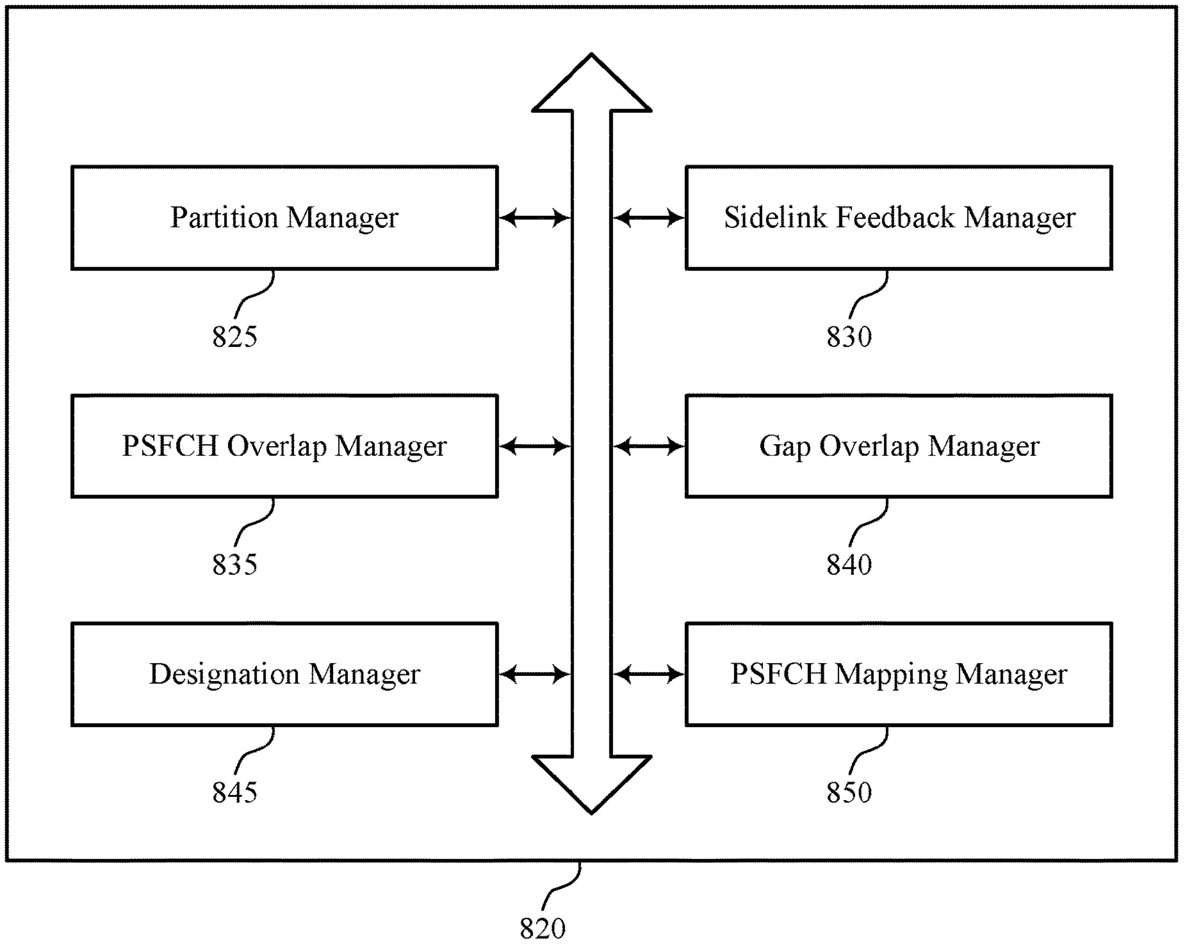
FIG. 8 shows a block diagram of a communications manager that supports sidelink feedback for full duplex UE in accordance with aspects of the present disclosure.

FIG. 8 shows a block diagram 800 of a communications manager 820 that supports sidelink feedback for full duplex UE in accordance with aspects of the present disclosure. The communications manager 820 may be an example of aspects of a communications manager 620, a communications manager 720, or both, as described herein. The communications manager 820, or various components thereof, may be an example of means for performing various aspects of sidelink feedback for full duplex UE as described herein. For example, the communications manager 820 may include a partition manager 825, a sidelink feedback manager 830, a PSFCH overlap manager 835, a gap overlap manager 840, a designation manager 845, an PSFCH mapping manager 850, or any combination thereof. Each of these components may communicate, directly or indirectly, with one another (e.g., via one or more buses).

The communications manager 820 may support wireless communication at a UE in accordance with examples as disclosed herein. The partition manager 825 may be configured as or otherwise support a means for partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The sidelink feedback manager 830 may be configured as or otherwise support a means for determining, for each of the first set of sidelink feedback resources and the second set of sidelink feedback resources, a set of sidelink feedback transmissions to perform or a set of sidelink feedback receptions to perform based on a priority level associated with each sidelink feedback message. In some examples, the sidelink feedback manager 830 may be configured as or otherwise support a means for performing the set of sidelink feedback transmissions, the set of sidelink feedback receptions, or both according to the determining.

In some examples, to support performing the set of sidelink feedback transmissions, the PSFCH overlap manager 835 may be configured as or otherwise support a means for performing the set of sidelink feedback transmissions using the first set of sidelink feedback resources and the set of sidelink feedback receptions using the second set of sidelink feedback resources. In some examples, performing the set of sidelink feedback transmissions using the first set of sidelink feedback resources and the set of sidelink feedback receptions using the second set of sidelink feedback resources is based on determining that no sidelink feedback transmissions or sidelink feedback receptions are scheduled in the set of gap resources.

In some examples, the PSFCH overlap manager 835 may be configured as or otherwise support a means for dropping one or more sidelink feedback transmissions, one or more sidelink feedback receptions, or both, based on determining that the one or more sidelink feedback transmissions, the one or more sidelink feedback receptions, or both, are scheduled in the set of gap resources.

In some examples, the gap overlap manager 840 may be configured as or otherwise support a means for identifying one or more sidelink feedback transmissions, one or more sidelink feedback receptions, or both, that are scheduled in the set of gap resources. In some examples, the gap overlap manager 840 may be configured as or otherwise support a means for determining the set of sidelink feedback transmissions to perform or the set of sidelink feedback receptions to perform using the first set of sidelink feedback resources, the second set of sidelink feedback resources, and the set of gap resources based on the identifying.

In some examples, the designation manager 845 may be configured as or otherwise support a means for designating, prior to the partitioning, the first set of sidelink feedback resources as sidelink feedback transmission resources and the second set of sidelink feedback resources as sidelink feedback reception resources. In some examples, the designation manager 845 may be configured as or otherwise support a means for performing the set of sidelink feedback transmissions using the first set of sidelink feedback resources and the set of sidelink feedback receptions using the second set of sidelink feedback resources based on the designating and the determining.

In some examples, the designation manager 845 may be configured as or otherwise support a means for performing the set of sidelink feedback transmissions using the first set of sidelink feedback resources and the set of sidelink feedback receptions using the second set of sidelink feedback resources based on determining that no sidelink feedback transmissions are scheduled in the second set of sidelink feedback resources and that no sidelink feedback receptions are scheduled in the first set of sidelink feedback resources.

In some examples, the designation manager 845 may be configured as or otherwise support a means for dropping one or more sidelink feedback transmissions, one or more sidelink feedback receptions, or both, based on determining that sidelink feedback transmissions are scheduled in the second set of sidelink feedback resources and that sidelink feedback receptions are scheduled in the first set of sidelink feedback resources.

In some examples, the PSFCH mapping manager 850 may be configured as or otherwise support a means for mapping a set of sidelink resources of a sidelink shared channel to use for performing sidelink communications based on the partitioning of the set of available sidelink feedback resources into the first set of sidelink feedback resources and the second set of sidelink feedback resources. In some examples, the partitioning is based on the mapping. In some examples, the PSFCH mapping manager 850 may be configured as or otherwise support a means for exchanging, with a sidelink UE associated with the sidelink communications, UE capability messages indicating support for the mapping, where the mapping is based on the UE capability messages.

In some examples, the PSFCH mapping manager 850 may be configured as or otherwise support a means for transmitting an indication of the mapping to a sidelink UE associated with the sidelink communications. In some examples, the PSFCH mapping manager 850 may be configured as or otherwise support a means for receiving an indication of the mapping from a sidelink UE associated with the sidelink communications, where the mapping is based on the indication.

Figure 9:
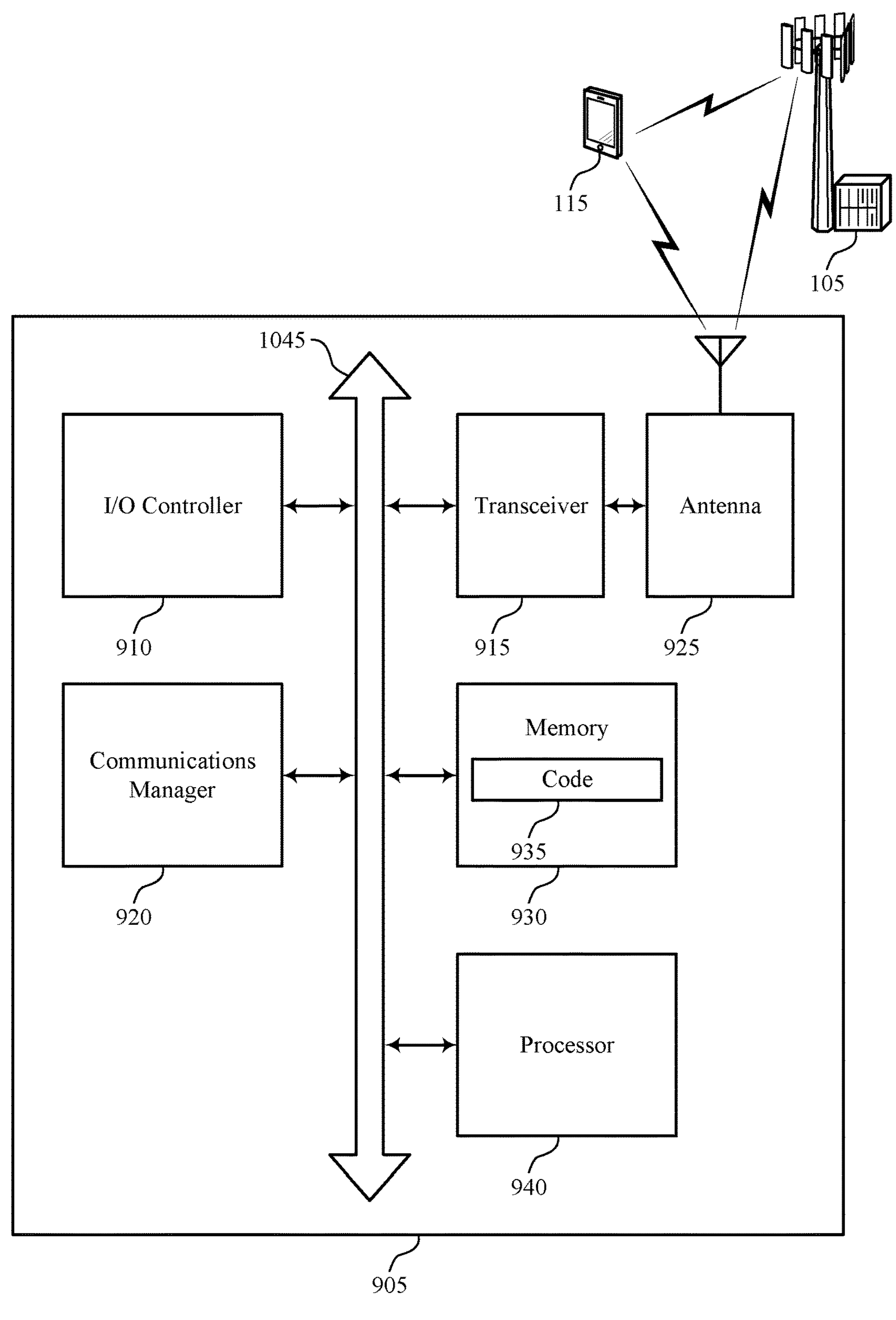
FIG. 9 shows a diagram of a system including a device that supports sidelink feedback for full duplex UE in accordance with aspects of the present disclosure.

FIG. 9 shows a diagram of a system 900 including a device 905 that supports sidelink feedback for full duplex UE in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink feedback for full duplex UE). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The communications manager 920 may be configured as or otherwise support a means for determining, for each of the first set of sidelink feedback resources and the second set of sidelink feedback resources, a set of sidelink feedback transmissions to perform or a set of sidelink feedback receptions to perform based on a priority level associated with each sidelink feedback message. The communications manager 920 may be configured as or otherwise support a means for performing the set of sidelink feedback transmissions, the set of sidelink feedback receptions, or both according to the determining.

By including or configuring the communications manager 920 in accordance with examples as described herein, the device 905 may support techniques for improved PSFCH communications by intelligent partitioning/mapping of available PSFCH resources into two or more segments and then using the priority level of each sidelink feedback message within each segment to perform sidelink feedback.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink feedback for full duplex UE as described herein, or the processor 940 and the memory 930 may be otherwise configured to perform or support such operations.

Figure 10:
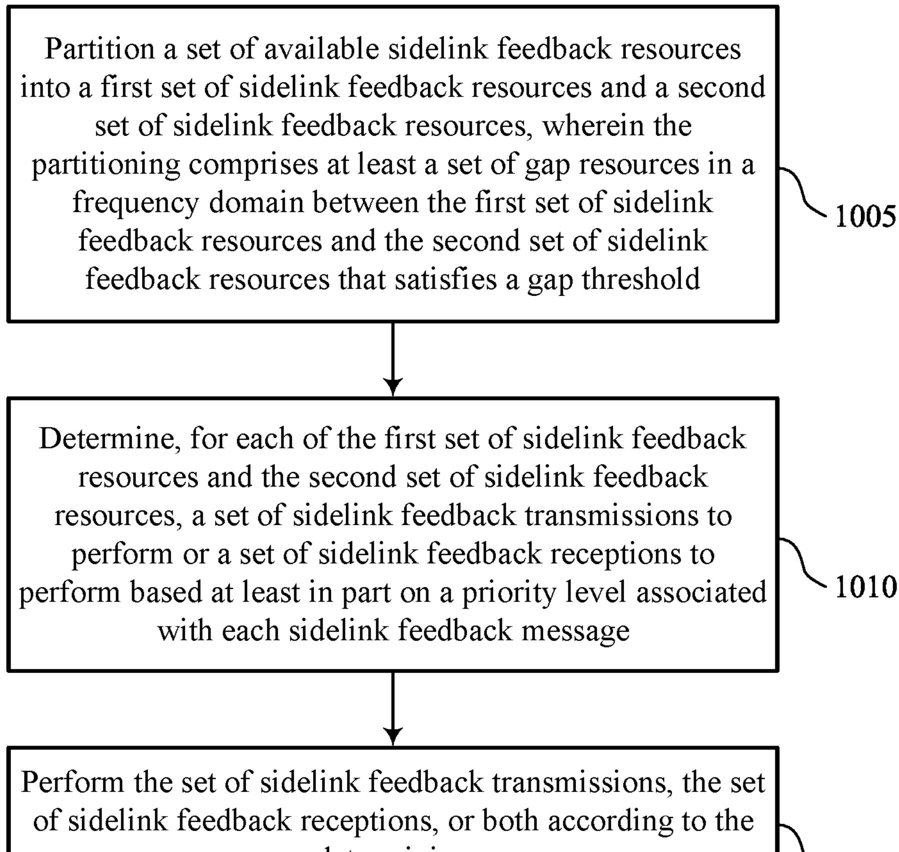
FIGS. 10 through 12 show flowcharts illustrating methods that support sidelink feedback for full duplex UE in accordance with aspects of the present disclosure.

FIG. 10 shows a flowchart illustrating a method 1000 that supports sidelink feedback for full duplex UE in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The operations of 1005 may be performed in accordance with examples as disclosed herein. In some examples, aspects of the operations of 1005 may be performed by a partition manager 825 as described with reference to FIG. 8.

At 1010, the method may include determining, for each of the first set of sidelink feedback resources and the second set of sidelink feedback resources, a set of sidelink feedback transmissions to perform or a set of sidelink feedback receptions to perform based on a priority level associated with each sidelink feedback message. The operations of 1010 may be performed in accordance with examples as disclosed herein. In some examples, aspects of the operations of 1010 may be performed by a sidelink feedback manager 830 as described with reference to FIG. 8.

At 1015, the method may include performing the set of sidelink feedback transmissions, the set of sidelink feedback receptions, or both according to the determining. The operations of 1015 may be performed in accordance with examples as disclosed herein. In some examples, aspects of the operations of 1015 may be performed by a sidelink feedback manager 830 as described with reference to FIG. 8.

Figure 11:
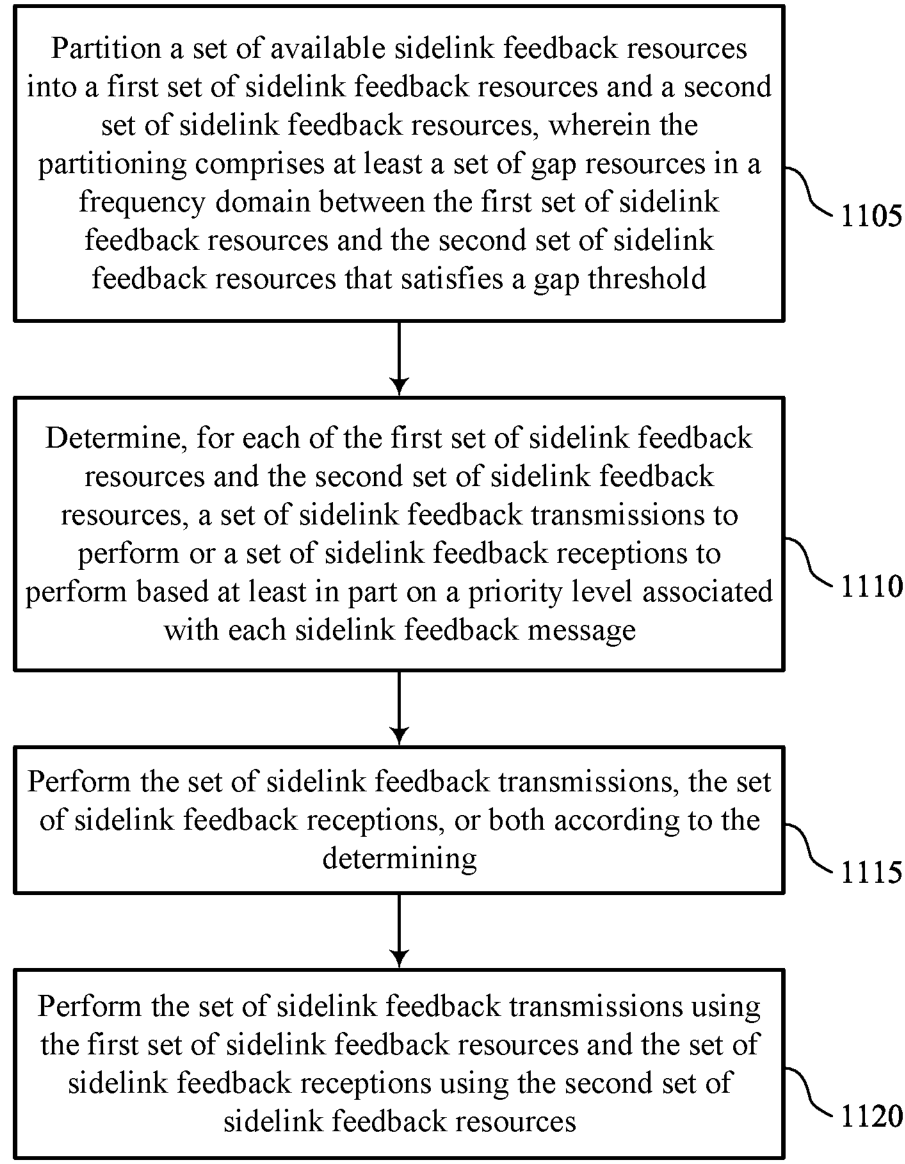

FIG. 11 shows a flowchart illustrating a method 1100 that supports sidelink feedback for full duplex UE in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The operations of 1105 may be performed in accordance with examples as disclosed herein. In some examples, aspects of the operations of 1105 may be performed by a partition manager 825 as described with reference to FIG. 8.

At 1110, the method may include determining, for each of the first set of sidelink feedback resources and the second set of sidelink feedback resources, a set of sidelink feedback transmissions to perform or a set of sidelink feedback receptions to perform based on a priority level associated with each sidelink feedback message. The operations of 1110 may be performed in accordance with examples as disclosed herein. In some examples, aspects of the operations of 1110 may be performed by a sidelink feedback manager 830 as described with reference to FIG. 8.

At 1115, the method may include performing the set of sidelink feedback transmissions, the set of sidelink feedback receptions, or both according to the determining. The operations of 1115 may be performed in accordance with examples as disclosed herein. In some examples, aspects of the operations of 1115 may be performed by a sidelink feedback manager 830 as described with reference to FIG. 8.

At 1120, the method may include performing the set of sidelink feedback transmissions using the first set of sidelink feedback resources and the set of sidelink feedback receptions using the second set of sidelink feedback resources. The operations of 1120 may be performed in accordance with examples as disclosed herein. In some examples, aspects of the operations of 1120 may be performed by a PSFCH overlap manager 835 as described with reference to FIG. 8.

Figure 12:
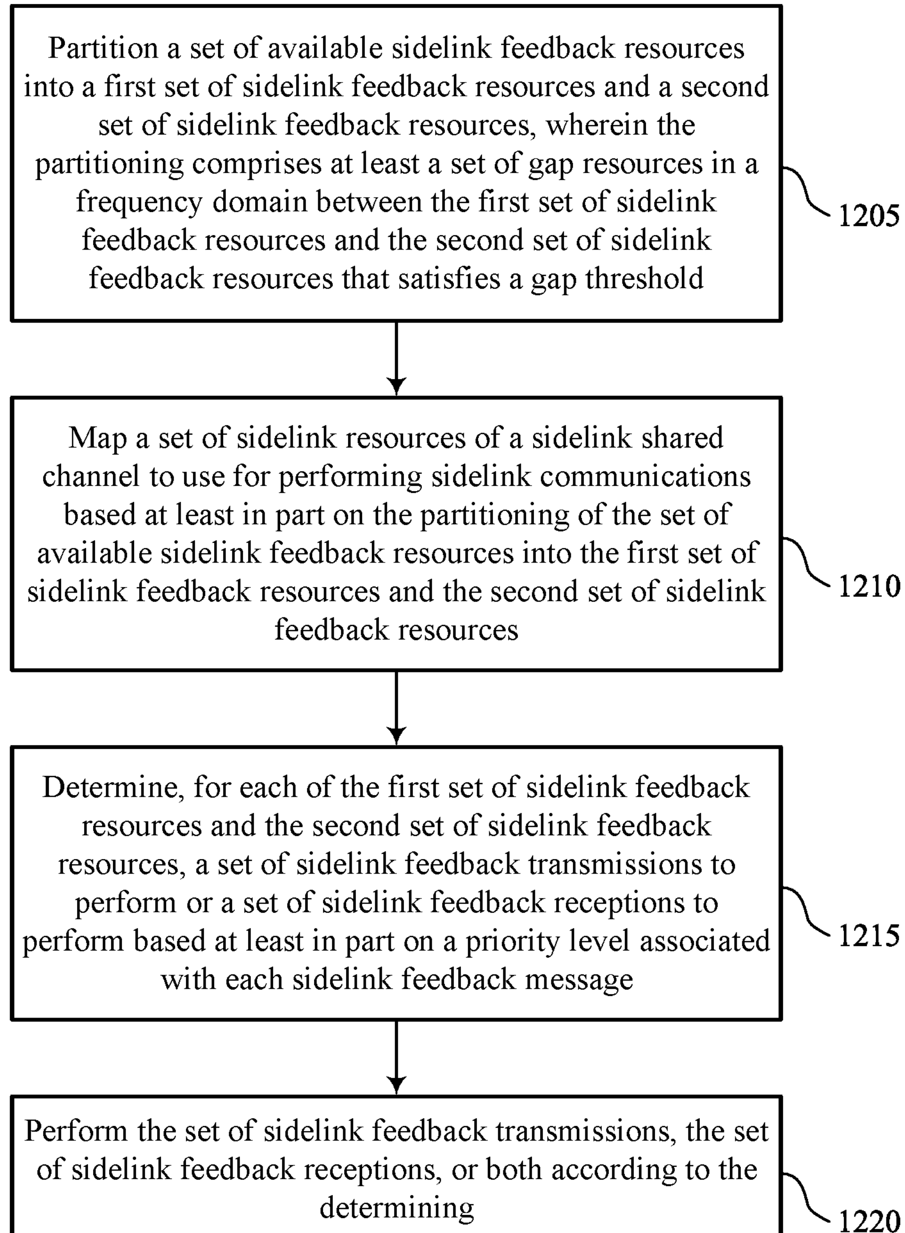

FIG. 12 shows a flowchart illustrating a method 1200 that supports sidelink feedback for full duplex UE in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include partitioning a set of available sidelink feedback resources into a first set of sidelink feedback resources and a second set of sidelink feedback resources, where the partitioning includes at least a set of gap resources in a frequency domain between the first set of sidelink feedback resources and the second set of sidelink feedback resources that satisfies a gap threshold. The operations of 1205 may be performed in accordance with examples as disclosed herein. In some examples, aspects of the operations of 1205 may be performed by a partition manager 825 as described with reference to FIG. 8.

At 1210, the method may include mapping a set of sidelink resources of a sidelink shared channel to use for performing sidelink communications based on the partitioning of the set of available sidelink feedback resources into the first set of sidelink feedback resources and the second set of sidelink feedback resources. The operations of 1210 may be performed in accordance with examples as disclosed herein. In some examples, aspects of the operations of 1210 may be performed by an PSFCH mapping manager 850 as described with reference to FIG. 8.

At 1215, the method may include determining, for each of the first set of sidelink feedback resources and the second set of sidelink feedback resources, a set of sidelink feedback transmissions to perform or a set of sidelink feedback receptions to perform based on a priority level associated with each sidelink feedback message. The operations of 1215 may be performed in accordance with examples as disclosed herein. In some examples, aspects of the operations of 1215 may be performed by a sidelink feedback manager 830 as described with reference to FIG. 8.

At 1220, the method may include performing the set of sidelink feedback transmissions, the set of sidelink feedback receptions, or both according to the determining. The operations of 1220 may be performed in accordance with examples as disclosed herein. In some examples, aspects of the operations of 1220 may be performed by a sidelink feedback manager 830 as described with reference to FIG. 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: partitioning a set of available sidelink feedback resources into a first set of sidelink feedback resources and a second set of sidelink feedback resources, wherein the partitioning comprises at least a set of gap resources in a frequency domain between the first set of sidelink feedback resources and the second set of sidelink feedback resources that satisfies a gap threshold; determining, for each of the first set of sidelink feedback resources and the second set of sidelink feedback resources, a set of sidelink feedback transmissions to perform or a set of sidelink feedback receptions to perform based at least in part on a priority level associated with each sidelink feedback message; and performing the set of sidelink feedback transmissions, the set of sidelink feedback receptions, or both according to the determining.

Aspect 2: The method of aspect 1, wherein performing the set of sidelink feedback transmissions further comprises: performing the set of sidelink feedback transmissions using the first set of sidelink feedback resources and the set of sidelink feedback receptions using the second set of sidelink feedback resources.

Aspect 3: The method of aspect 2, wherein performing the set of sidelink feedback transmissions using the first set of sidelink feedback resources and the set of sidelink feedback receptions using the second set of sidelink feedback resources is based at least in part on determining that no sidelink feedback transmissions or sidelink feedback receptions are scheduled in the set of gap resources.

Aspect 4: The method of any of aspects 2 through 3, further comprising: dropping one or more sidelink feedback transmissions, one or more sidelink feedback receptions, or both, based at least in part on determining that the one or more sidelink feedback transmissions, the one or more sidelink feedback receptions, or both, are scheduled in the set of gap resources.

Aspect 5: The method of any of aspects 1 through 4, further comprising: identifying one or more sidelink feedback transmissions, one or more sidelink feedback receptions, or both, that are scheduled in the set of gap resources; and determining the set of sidelink feedback transmissions to perform or the set of sidelink feedback receptions to perform using the first set of sidelink feedback resources, the second set of sidelink feedback resources, and the set of gap resources based at least in part on the identifying.

Aspect 6: The method of any of aspects 1 through 5, further comprising: designating, prior to the partitioning, the first set of sidelink feedback resources as sidelink feedback transmission resources and the second set of sidelink feedback resources as sidelink feedback reception resources; and performing the set of sidelink feedback transmissions using the first set of sidelink feedback resources and the set of sidelink feedback receptions using the second set of sidelink feedback resources based at least in part on the designating and the determining.

Aspect 7: The method of aspect 6, further comprising: performing the set of sidelink feedback transmissions using the first set of sidelink feedback resources and the set of sidelink feedback receptions using the second set of sidelink feedback resources based at least in part on determining that no sidelink feedback transmissions are scheduled in the second set of sidelink feedback resources and that no sidelink feedback receptions are scheduled in the first set of sidelink feedback resources.

Aspect 8: The method of any of aspects 6 through 7, further comprising: dropping one or more sidelink feedback transmissions, one or more sidelink feedback receptions, or both, based at least in part on determining that sidelink feedback transmissions are scheduled in the second set of sidelink feedback resources and that sidelink feedback receptions are scheduled in the first set of sidelink feedback resources.

Aspect 9: The method of any of aspects 1 through 8, further comprising: mapping a set of sidelink resources of a sidelink shared channel to use for performing sidelink communications based at least in part on the partitioning of the set of available sidelink feedback resources into the first set of sidelink feedback resources and the second set of sidelink feedback resources.

Aspect 10: The method of aspect 9, wherein the partitioning is based at least in part on the mapping.

Aspect 11: The method of any of aspects 9 through 10, further comprising: exchanging, with a sidelink UE associated with the sidelink communications, UE capability messages indicating support for the mapping, wherein the mapping is based at least in part on the UE capability messages.

Aspect 12: The method of any of aspects 9 through 11, further comprising: transmitting an indication of the mapping to a sidelink UE associated with the sidelink communications.

Aspect 13: The method of any of aspects 9 through 12, further comprising: receiving an indication of the mapping from a sidelink UE associated with the sidelink communications, wherein the mapping is based at least in part on the indication.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

partitioning a set of available sidelink feedback resources into a first set of sidelink feedback resources and a second set of sidelink feedback resources, wherein the partitioning comprises at least a set of gap resources in a frequency domain between the first set of sidelink feedback resources and the second set of sidelink feedback resources that satisfies a gap threshold;

selecting, for the first set of sidelink feedback resources and based at least in part on first respective priority levels associated with first sidelink feedback transmissions and first sidelink feedback receptions, between using the first set of sidelink feedback resources to perform the first sidelink feedback transmissions and using the first set of sidelink feedback resources to perform the first sidelink feedback receptions;

selecting, for the second set of sidelink feedback resources and based at least in part on second respective priority levels associated with second sidelink feedback transmissions and second sidelink feedback receptions, between using the second set of sidelink feedback resources to perform the second sidelink feedback transmissions and using the second set of sidelink feedback resources to perform the second sidelink feedback receptions;

performing, using the first set of sidelink feedback resources, the selected one of the first sidelink feedback transmissions or the first sidelink feedback receptions in accordance with the selecting for the first set of sidelink feedback resources; and performing, using the second set of sidelink feedback resources, the selected one of the second sidelink feedback transmissions or the second sidelink feedback receptions in accordance with the selecting for the second set of sidelink feedback resources.

2. The method of claim 1, wherein:

performing the selected one of the first sidelink feedback transmissions or the first sidelink feedback receptions comprises performing the first sidelink feedback transmissions using the first set of sidelink feedback resources; and performing the selected one of the second sidelink feedback transmissions or the second sidelink feedback receptions comprises performing the second sidelink feedback receptions using the second set of sidelink feedback resources.

3. The method of claim 2, wherein performing the first sidelink feedback transmissions using the first set of sidelink feedback resources and performing the second sidelink feedback receptions using the second set of sidelink feedback resources is based at least in part on determining that no sidelink feedback transmissions or sidelink feedback receptions are scheduled in the set of gap resources.

4. The method of claim 2, further comprising:

dropping one or more sidelink feedback transmissions, one or more sidelink feedback receptions, or both, based at least in part on determining that the one or more sidelink feedback transmissions, the one or more sidelink feedback receptions, or both, are scheduled in the set of gap resources.

5. The method of claim 1, further comprising:

identifying one or more sidelink feedback transmissions, one or more sidelink feedback receptions, or both, that are scheduled in the set of gap resources, wherein the selecting for the first set of sidelink feedback resources and the selecting for the second set of sidelink feedback resources are based at least in part on the identifying.

6. The method of claim 1, further comprising:

designating, prior to the partitioning, the first set of sidelink feedback resources as sidelink feedback transmission resources and the second set of sidelink feedback resources as sidelink feedback reception resources, wherein, based at least in part on the designating:

the selected one of the first sidelink feedback transmissions or the first sidelink feedback receptions comprises the first sidelink feedback transmissions; and the selected one of the second sidelink feedback transmissions or the second sidelink feedback receptions comprises the second sidelink feedback receptions.

7. The method of claim 6, wherein, based at least in part on determining that no sidelink feedback transmissions are scheduled in the second set of sidelink feedback resources and that no sidelink feedback receptions are scheduled in the first set of sidelink feedback resources:

the selected one of the first sidelink feedback transmissions or the first sidelink feedback receptions comprises the first sidelink feedback transmissions; and the selected one of the second sidelink feedback transmissions or the second sidelink feedback receptions comprises the second sidelink feedback receptions.

8. The method of claim 6, further comprising:

dropping one or more sidelink feedback transmissions, one or more sidelink feedback receptions, or both, based at least in part on determining that sidelink feedback transmissions are scheduled in the second set of sidelink feedback resources and that sidelink feedback receptions are scheduled in the first set of sidelink feedback resources.

9. The method of claim 1, further comprising:

mapping a set of sidelink resources of a sidelink shared channel to use for performing sidelink communications based at least in part on the partitioning of the set of available sidelink feedback resources into the first set of sidelink feedback resources and the second set of sidelink feedback resources.

10. The method of claim 9, wherein the partitioning is based at least in part on the mapping.

11. The method of claim 9, further comprising:

exchanging, with a sidelink UE associated with the sidelink communications, UE capability messages indicating support for the mapping, wherein the mapping is based at least in part on the UE capability messages.

12. The method of claim 9, further comprising:

transmitting an indication of the mapping to a sidelink UE associated with the sidelink communications.

13. The method of claim 9, further comprising:

receiving an indication of the mapping from a sidelink UE associated with the sidelink communications, wherein the mapping is based at least in part on the indication.

14. A user equipment (UE) for wireless communication, comprising:

one or more memories storing processor-executable code; and one or more processors coupled with the one or more memories and operable to execute the code to cause the UE to:

partition a set of available sidelink feedback resources into a first set of sidelink feedback resources and a second set of sidelink feedback resources, wherein the partitioning comprises at least a set of gap resources in a frequency domain between the first set of sidelink feedback resources and the second set of sidelink feedback resources that satisfies a gap threshold;

select, for the first set of sidelink feedback resources and based at least in part on first respective priority levels associated with first sidelink feedback transmissions and first sidelink feedback receptions, between using the first set of sidelink feedback resources to perform the first sidelink feedback transmissions and using the first set of sidelink feedback resources to perform the first sidelink feedback receptions;

select, for the second set of sidelink feedback resources and based at least in part on second respective priority levels associated with second sidelink feedback transmissions and second sidelink feedback receptions, between using the second set of sidelink feedback resources to perform the second sidelink feedback transmissions and using the second set of sidelink feedback resources to perform the second sidelink feedback receptions;

perform, using the first set of sidelink feedback resources, the selected one of the first sidelink feedback transmissions or the first sidelink feedback receptions in accordance with the selecting for the first set of sidelink feedback resources; and perform, using the second set of sidelink feedback resources, the selected one of the second sidelink feedback transmissions or the second sidelink feedback receptions in accordance with the selecting for the second set of sidelink feedback resources.

15. The UE of claim 14, wherein:

to perform the selected one of the first sidelink feedback transmissions or the first sidelink feedback receptions, the one or more processors are operable to execute the code cause the UE to perform the first sidelink feedback transmissions using the first set of sidelink feedback resources; and to perform the selected one of the second sidelink feedback transmissions or the second sidelink feedback receptions, the one or more processors are operable to execute the code cause the UE to perform the second sidelink feedback receptions using the second set of sidelink feedback resources.

16. The UE of claim 15, wherein the one or more processors are operable to execute the code cause the UE to perform the first sidelink feedback transmissions using the first set of sidelink feedback resources and the second sidelink feedback receptions using the second set of sidelink feedback resources based at least in part on determining that no sidelink feedback transmissions or sidelink feedback receptions are scheduled in the set of gap resources.

17. The UE of claim 15, wherein the one or more processors are further operable to execute the code to cause the UE to:

drop one or more sidelink feedback transmissions, one or more sidelink feedback receptions, or both, based at least in part on determining that the one or more sidelink feedback transmissions, the one or more sidelink feedback receptions, or both, are scheduled in the set of gap resources.

18. The UE of claim 14, wherein the one or more processors are further operable to execute the code to cause the UE to:

identify one or more sidelink feedback transmissions, one or more sidelink feedback receptions, or both, that are scheduled in the set of gap resources wherein the one or more processors are operable to execute the code cause the UE to do the selecting for the first set of sidelink feedback resources and the selecting for the second set of sidelink feedback resources based at least in part on the identifying.

19. The UE of claim 14, wherein the one or more processors are further operable to execute the code to cause the UE to:

designate, prior to the partitioning, the first set of sidelink feedback resources as sidelink feedback transmission resources and the second set of sidelink feedback resources as sidelink feedback reception resources, wherein, based at least in part on the designating, the one or more processors are operable to execute the code cause the UE to:

select the first sidelink feedback transmissions for the first set of sidelink feedback resources; and select the second sidelink feedback receptions for the second set of sidelink feedback resources.

20. The UE of claim 19, wherein, based at least in part on determining that no sidelink feedback transmissions are scheduled in the second set of sidelink feedback resources and that no sidelink feedback receptions are scheduled in the first set of sidelink feedback resources, the one or more processors are operable to execute the code cause the UE to:

select the first sidelink feedback transmissions for the first set of sidelink feedback resources; and select the second sidelink feedback receptions for the second set of sidelink feedback resources.

21. The UE of claim 19, wherein the one or more processors are further operable to execute the code to cause the UE to:

drop one or more sidelink feedback transmissions, one or more sidelink feedback receptions, or both, based at least in part on determining that sidelink feedback transmissions are scheduled in the second set of sidelink feedback resources and that sidelink feedback receptions are scheduled in the first set of sidelink feedback resources.

22. The UE of claim 14, wherein the one or more processors are further operable to execute the code to cause the UE to:

map a set of sidelink resources of a sidelink shared channel to use for performing sidelink communications based at least in part on the partitioning of the set of available sidelink feedback resources into the first set of sidelink feedback resources and the second set of sidelink feedback resources.

23. The UE of claim 22, wherein the one or more processors are operable to execute the code cause the UE to do the partitioning based at least in part on the mapping.

24. The UE of claim 22, wherein the one or more processors are further operable to execute the code to cause the UE to:

exchange, with a sidelink UE associated with the sidelink communications, UE capability messages indicating support for the mapping, wherein the mapping is based at least in part on the UE capability messages.

25. The UE of claim 22, wherein the one or more processors are further operable to execute the code to cause the UE to:

transmit an indication of the mapping to a sidelink UE associated with the sidelink communications.

26. The UE of claim 22, wherein the one or more processors are further operable to execute the code to cause the UE to:

receive an indication of the mapping from a sidelink UE associated with the sidelink communications, wherein the mapping is based at least in part on the indication.

27. A user equipment (UE) for wireless communication, comprising:

means for partitioning a set of available sidelink feedback resources into a first set of sidelink feedback resources and a second set of sidelink feedback resources, wherein the partitioning comprises at least a set of gap resources in a frequency domain between the first set of sidelink feedback resources and the second set of sidelink feedback resources that satisfies a gap threshold;

means for selecting, for the first set of sidelink feedback resources and based at least in part on first respective priority levels associated with first sidelink feedback transmissions and first sidelink feedback receptions, between using the first set of sidelink feedback resources to perform the first sidelink feedback transmissions and using the first set of sidelink feedback resources to perform the first sidelink feedback receptions;

means for selecting, for the second set of sidelink feedback resources and based at least in part on second respective priority levels associated with second sidelink feedback transmissions and second sidelink feedback receptions, between using the second set of sidelink feedback resources to perform the second sidelink feedback transmissions and using the second set of sidelink feedback resources to perform the second sidelink feedback receptions;

means for performing, using the first set of sidelink feedback resources, the selected one of the first sidelink feedback transmissions or the first sidelink feedback receptions in accordance with the selecting for the first set of sidelink feedback resources; and performing, using the second set of sidelink feedback resources, the selected one of the second sidelink feedback transmissions or the second sidelink feedback receptions in accordance with the selecting for the second set of sidelink feedback resources.

28. The UE of claim 27, wherein:

the means for performing the selected one of the first sidelink feedback transmissions or the first sidelink feedback receptions comprise means for performing the first sidelink feedback transmissions using the first set of sidelink feedback resources; and the means for performing the selected one of the second sidelink feedback transmissions or the second sidelink feedback receptions comprise means for performing the second sidelink feedback receptions using the second set of sidelink feedback resources.

29. The UE of claim 28, wherein performing the first sidelink feedback transmissions using the first set of sidelink feedback resources and performing the second sidelink feedback receptions using the second set of sidelink feedback resources is based at least in part on determining that no sidelink feedback transmissions or sidelink feedback receptions are scheduled in the set of gap resources.

30. A non-transitory computer-readable medium storing code for wireless communication at a user equipment (UE), the code comprising instructions executable by a processor to:

partition a set of available sidelink feedback resources into a first set of sidelink feedback resources and a second set of sidelink feedback resources, wherein the partitioning comprises at least a set of gap resources in a frequency domain between the first set of sidelink feedback resources and the second set of sidelink feedback resources that satisfies a gap threshold;

select, for the first set of sidelink feedback resources and based at least in part on first respective priority levels associated with first sidelink feedback transmissions and first sidelink feedback receptions, between using the first set of sidelink feedback resources to perform the first sidelink feedback transmissions and using the first set of sidelink feedback resources to perform the first sidelink feedback receptions;

select, for the second set of sidelink feedback resources and based at least in part on second respective priority levels associated with second sidelink feedback transmissions and second sidelink feedback receptions, between using the second set of sidelink feedback resources to perform the second sidelink feedback transmissions and using the second set of sidelink feedback resources to perform the second sidelink feedback receptions;

perform, using the first set of sidelink feedback resources, the selected one of the first sidelink feedback transmissions or the first sidelink feedback receptions in accordance with the selecting for the first set of sidelink feedback resources; and perform, using the second set of sidelink feedback resources, the selected one of the second sidelink feedback transmissions or the second sidelink feedback receptions in accordance with the selecting for the second set of sidelink feedback resources.

* * * * *